(12) United States Patent
Beerana et al.

(10) Patent No.: US 12,094,356 B2
(45) Date of Patent: Sep. 17, 2024

(54) COLORBLIND ASSISTIVE TECHNOLOGY SYSTEM AND METHOD TO IMPROVE IMAGE RENDERING BY GENERATING A COLOR TRANSLATION TABLE FOR COLOR VISION DEFICIENT USERS

(71) Applicant: Microsoft Technology Licensing, LLC, Redmond, WA (US)

(72) Inventors: Somasundaram Kumaresan Beerana, Sammamish, WA (US); Ankit Mahajan, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/459,723

(22) Filed: Sep. 1, 2023

(65) Prior Publication Data

US 2023/0419861 A1    Dec. 28, 2023

Related U.S. Application Data

(63) Continuation of application No. 17/017,662, filed on Sep. 10, 2020, now Pat. No. 11,783,729.

(51) Int. Cl.
| | | |
|---|---|---|
| G09B 21/00 | (2006.01) | |
| G06T 5/00 | (2024.01) | |
| G06T 7/90 | (2017.01) | |
| G06T 11/00 | (2006.01) | |

(52) U.S. Cl.
CPC .............. *G09B 21/008* (2013.01); *G06T 5/00* (2013.01); *G06T 7/90* (2017.01); *G06T 11/001* (2013.01)

(58) Field of Classification Search
CPC ......... G09B 21/008; G06T 5/001; G06T 7/90; G06T 11/001; G06T 5/009
See application file for complete search history.

(56) References Cited

U.S. PATENT DOCUMENTS

2017/0195658 A1*  7/2017  Jung ................... G09G 3/3233

OTHER PUBLICATIONS

Communication pursuant to Article 94(3) EPC, Received for European Application No. 21732708.9, mailed on Feb. 2, 2024, 05 pages.

* cited by examiner

*Primary Examiner* — Christopher Wait
(74) *Attorney, Agent, or Firm* — NovoTechIP International PLLC

(57) ABSTRACT

Systems and methods for providing colorblind-accessible versions of a color image by generating a color translation table for color vision deficiency (CVD) corrections are disclosed. For a given image, the pixel values as would be seen by a colorblind user are determined. Using these values, a corrected rendered image that appears to colorblind users as depicting a similar color scheme as the original image is produced and presented to the colorblind user. The proposed systems can be implemented with previously captured image data, real-time video, and as an add-on to other applications.

20 Claims, 15 Drawing Sheets

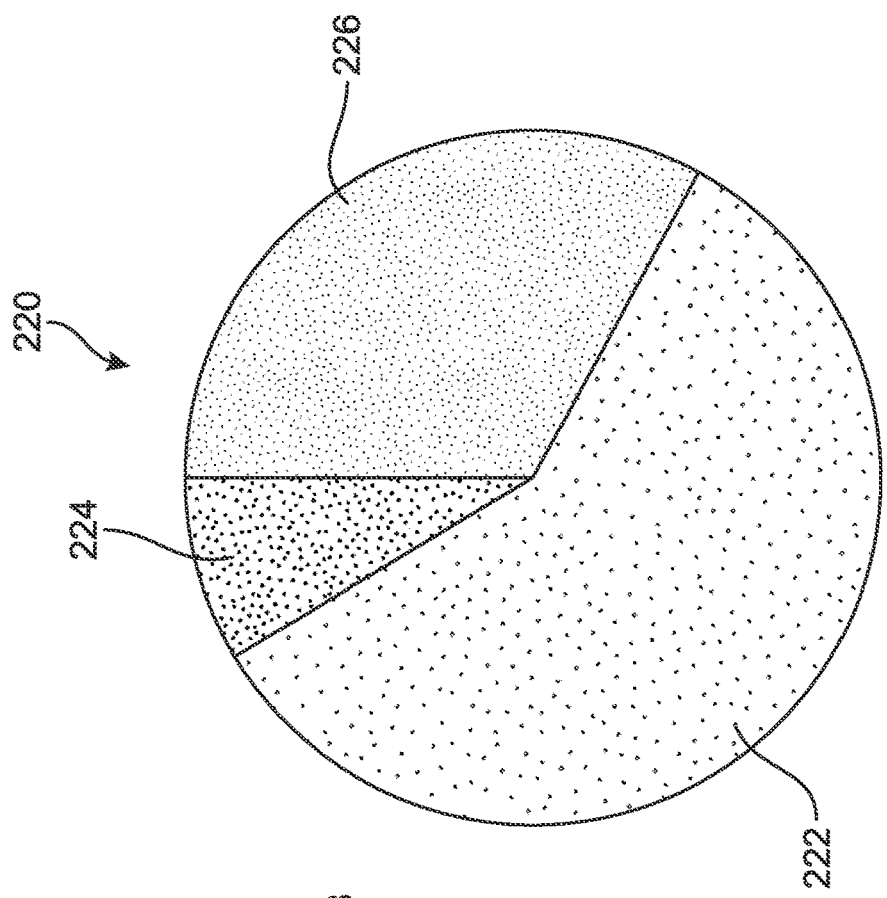
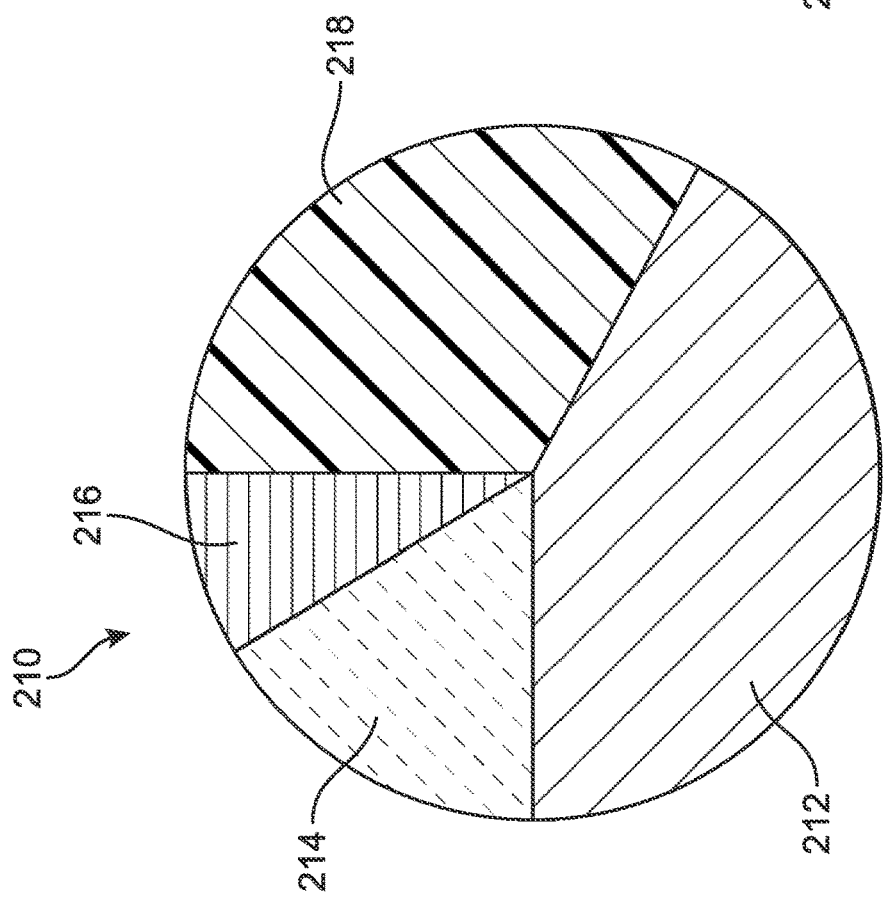
FIG. 2

COLORBLIND ASSISTIVE TECHNOLOGY SYSTEM AND METHOD TO IMPROVE IMAGE RENDERING BY GENERATING A COLOR TRANSLATION TABLE FOR COLOR VISION DEFICIENT USERS

CROSS-REFERENCE TO RELATED APPLICATION

This application claims the benefit of priority to U.S. patent application Ser. No. 17/017,662, filed Sep. 10, 2020 and entitled "COLORBLIND ASSISTIVE TECHNOLOGY SYSTEM AND METHOD TO IMPROVE IMAGE RENDERING FOR COLOR VISION DEFICIENT USERS BY DETERMINING AN ESTIMATED COLOR VALUE HAVING A MINIMUM COLOR DISTANCE FROM A TARGET COLOR VALUE," the entire disclosures of which are incorporated herein by reference.

BACKGROUND

An estimated 15 percent of the world's population has a disability. In many settings, people with disabilities are marginalized from the socio-economic activities of their communities. People with disabilities are also thought to be less likely to participate in sport, recreation, and leisure activities than people without disability. One subset of the disabled includes those people who have difficulty distinguishing one color from another. This condition is called 'color vision deficiency', and is known colloquially as "color blindness." Several different forms of color vision deficiency are recognized, including red-green dichromacy (protanopia, deuteranopia), anomalous red-green trichromacy (protanomaly and deuteranomaly), blue-yellow dichromacy (tritanopia) and anomalous blue-yellow trichromacy (tritanomaly). Each form is caused by the expression of a recessive genetic trait that reduces the variety of retinal cones in the affected person's eyes, or makes particular cones less sensitive and/or sensitive to a changed range of wavelengths. Carried primarily on the Y chromosome, these traits may affect 7 to 10% of the male population, and about 0.5% of the female population. Total color blindness (monochromacy) is also recognized, as are injury-related color vision defects.

In day-to-day life, color vision deficiency may be associated with some degree of disability. For example, it may tax an affected person's ability to decipher information in images and media or other color-based content. It may disqualify the person for employment in fields where acute color vision is required. Moreover, a color vision deficit may occlude the affected person's overall perception—and enjoyment—of the visual world. Unfortunately, there is currently no medical cure or treatment for color vision deficiency.

Today, there are thousands of assistive technology products on the market to help people with disabilities with all sorts of needs, from the simple to the sophisticated. However, improvements in accessibility for the colorblind has remained limited, and further do not well address the challenge of facilitating the differentiation between colors. For example, many conventional approaches modify user interface color schemes to use highly contrasting colors to allow colorblind individuals to distinguish between different displayed items more readily. However, such approaches have significant shortcomings in allowing colorblind individuals to appreciate the more complex and subtle differences fully and accurately in colors presented in photorealistic image content. Instead, colorblind individuals are left unable to perform color-related tasks that are easily performed by non-colorblind individuals, such as identifying differences in color and accurately identifying colors across the color spectrum. Thus, there have remained technical problems with assistive technologies for which new technical solutions and improvements will enable colorblind individuals the ability to more fully perceive the world around them.

SUMMARY

A method of generating a color translation table for color vision deficiency (CVD) correction comprising selecting a plurality of source color values, for each of the source color values, identifying a respective estimated color value associated with the source color value, the estimated color value being a simulation of the source color value as it would be perceived by the user with CVD and associating each estimated color value with its respective source color value. The color translation table is generated by: selecting a plurality of target color values; for each target color value included in the plurality of target color values, determining respective color distances from each of the estimated color values; for each target color value in the plurality of target color values, identifying one of the source color values associated with one of the estimated color values having a smallest color distance from the target color value; and storing associations between each of the target color values and respective identified source color values to provide the color translation table between the source color values and the target color values to be substituted for the source color values in a display on a display device corrected for the user with CVD. The color translation table is utilized to convert colors in a source image to corrected colors for display for the user with CVD on the display device.

A machine-readable medium including instructions therein which, when executed by a processor, causes the processor, alone or in combination with other processors, to perform the following functions to generate a color translation table for color vision deficiency (CVD) correction: selecting a plurality of source color values, for each of the source color values, identifying a respective estimated color value associated with the source color value, the estimated color value being a simulation of the source color value as it would be perceived by the user with CVD and associating each estimated color value with its respective source color value. The color translation table is generated by: selecting a plurality of target color values; for each target color value included in the plurality of target color values, determining respective color distances from each of the estimated color values; for each target color value in the plurality of target color values, identifying one of the source color values associated with one of the estimated color values having a smallest color distance from the target color value; and storing associations between each of the target color values and respective identified source color values to provide the color translation table between the source color values and the target color values to be substituted for the source color values in a display on a display device corrected for the user with CVD. The color translation table is utilized to convert colors in a source image to corrected colors for display for the user with CVD on the display device.

A system for generating a color translation table for color vision deficiency (CVD) correction, the system including a processor and a memory, coupled to the processor, configured to store executable instructions that, when executed by the processor, alone or in combination with other processors, cause the processor to: select a plurality of source color values, for each of the source color values, identify a respective estimated color value associated with the source color value, the estimated color value being a simulation of the source color value as it would be perceived by the user with CVD and associate each estimated color value with its respective source color value. The color translation table is generated by: selecting a plurality of target color values; for each target color value included in the plurality of target color values, determining respective color distances from each of the estimated color values; for each target color value in the plurality of target color values, identifying one of the source color values associated with one of the estimated color values having a smallest color distance from the target color value; and storing associations between each of the target color values and respective identified source color values to provide the color translation table between the source color values and the target color values to be substituted for the source color values in a display on a display device corrected for the user with CVD. The color translation table is utilized to convert colors in a source image to corrected colors for display for the user with CVD on the display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 is a conceptual diagram presenting examples of the appearance of the same chart as would be seen with normal color vision and colorblind vision;

DETAILED DESCRIPTION

Figure 1A:
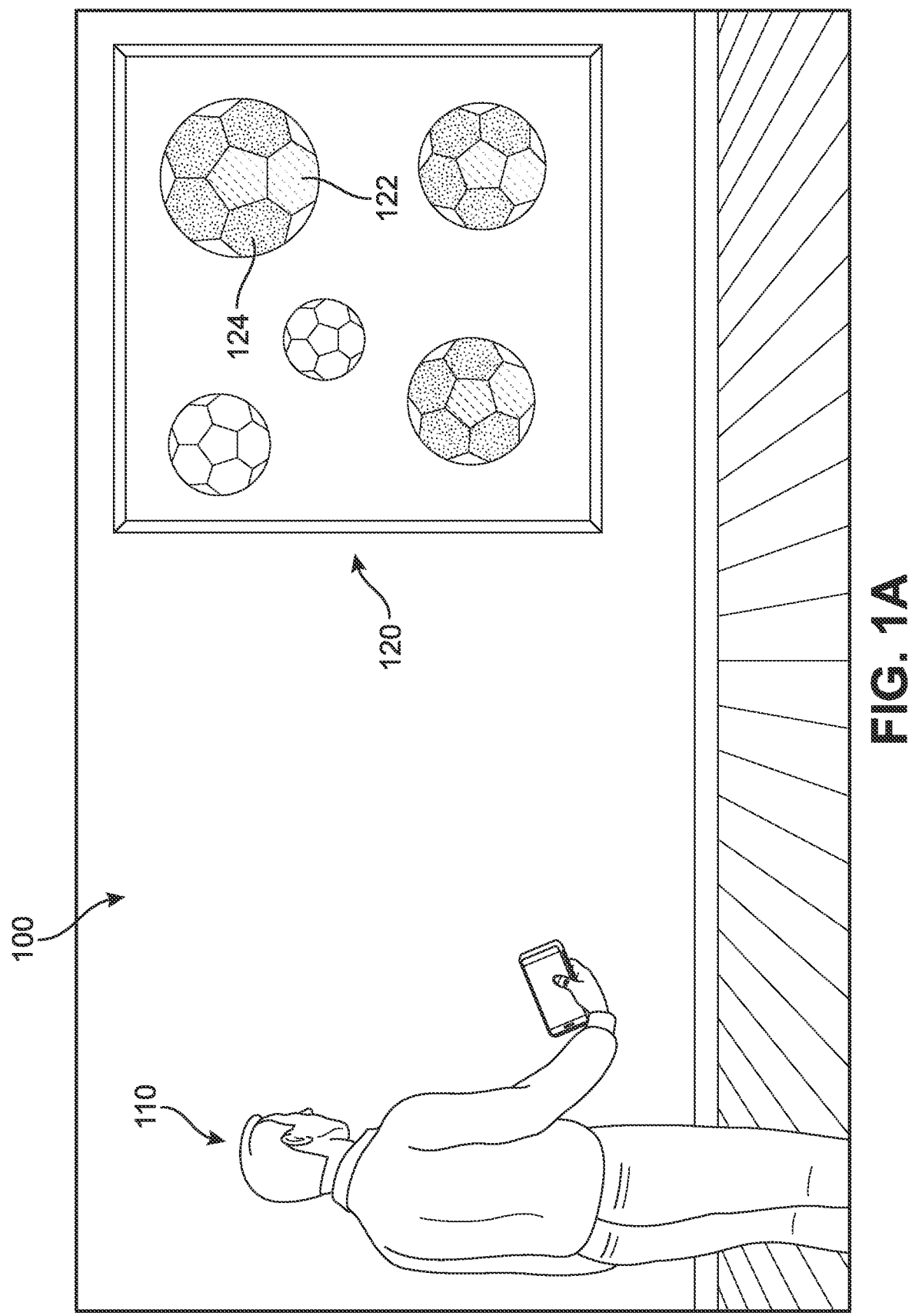
FIGS. 1A and 1B illustrate an example of a color correction system and method.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Colorblindness, formally referred to as color vision deficiency (CVD), affects about 8% of men and 0.8% of women globally. Colorblindness causes those affected to have a difficult time discriminating certain color combinations and color differences. Generally, colorblind viewers are deficient in the physical components necessary to enable them to distinguish and detect particular colors. As a result of the loss of color information, many visual objects, such as images and videos, which have high color quality in the eyes of a non-affected viewer, cannot typically be fully appreciated by those with colorblindness. As noted above, protanopes and deuteranopes have difficulty discriminating red hues from green hues, whereas tritanopes have difficulty discriminating blue hues from yellow hues. No matter the specific type of color vision deficiency, a colorblind viewer may have difficulty when searching for a portion of an image that contains a specific color, for example, a red apple. For example, the colorblind viewer may not be able to distinguish whether an apple in an image is red or green.

The following description presents various implementations of technical solutions and improvements in the forms of methods and systems for promoting inclusion and access of color vision-impaired persons in perceiving colors and differentiating between objects or patterns that have multiple colors or hues. The following implementations can be used to transform an original, first image to a rendered second image that is recolored and optimized for viewing by a colorblind user. For example, the color values of the first image will be automatically adjusted with reference to a color conversion model (which, in some implementations may be implemented using one or more lookup tables) in order to allow the colorblind user to better distinguish between and/or identify particular colors in the image. In one implementation, an image can be modified to produce for a colorblind user a perception of color close that perceived by a user with normal color vision. The systems described herein may be adapted for use across a wide range of applications and industries, including military, education, entertainment, research, and healthcare.

In different implementations, the proposed techniques can be used to convert or "translate" the appearance of digital images or a wide range of other electronic content for viewing by a colorblind user. In general, the term "electronic content" or "image" includes any digital data or information that may be visually represented, including but not limited to an electronic document, a media stream, real-time video capture, real-time image display, a document, web pages, a hypertext document, any image, digital video or a video recording, animation, and other digital data. As an example, this electronic content may include images captured by photography applications, or other software configured to provide users with tools for use with digital images. Thus, the use of the term "image" should be understood to encompass all types of electronic content, both dynamic and static, that may be presented visually to an end-user. In addition, references to the "real", "original", or "normal" appearance of a real-world scene or image describes how the visual information would appear to a normal color vision person, while a "rendered", "recolored", "virtual" or "accessible" image describes the image that has been altered for viewing by a colorblind user using embodiments of the techniques described herein.

Furthermore, an end-user includes a colorblind user of application programs, as well as the apparatus and systems described herein. For purpose of this description, the term "software application", "software", or "application" refers to a computer program that performs useful work, generally unrelated to the computer itself. Some non-limiting examples of software applications include photography software, image capture/editing applications, word processors, spreadsheets, slideshows, presentation design applications, accounting systems, and telecommunication programs, as well as gaming software, utility and productivity tools, mobile applications, presentation graphics, and other productivity software. Some of the proposed embodiments may be implemented as standalone applications, while others may be incorporated or run in conjunction with another program. In other words, a user may access a website, document, or other electronic content via a first application and use the proposed systems to translate one or more colors in the electronic content to different colors that would be perceptible to the colorblind.

In some implementations, the software application that may incorporate the disclosed features can be installed on a client's device, or be associated with a third-party application, such as a web-browser application that is configured to communicate with the device. These devices can include, for example, desktop computers, mobile computers, mobile communications devices (such as mobile phones, smart phones, tablets, etc.), smart televisions, gaming devices, set-top boxes, and/or any other computing devices that include a camera and/or an image-display capability. Generally, such applications permit end-users to capture or scan documents, presentations, real-world objects, and other subjects using images received by a camera or images stored or accessed from memory. Furthermore, in some implementations, camera-based scanning applications can be configured to implement the CVD color correction techniques described herein. Image conversion may occur in real-time (e.g., while a camera is pointed at a scene or object(s)) and/or following the capture, generation, or storing of an image in memory.

For purposes of simplicity, the following implementations discuss the use of the system within the context of mobile computing devices, such as mobile phones and tablets. However, any electronic device with a camera may benefit from the use of these systems. These devices can provide users with several input mechanisms, including a home button, a power button, a mode button, and/or a camera shutter (image-capture) button, which may be installed as hardware, or available via a touchscreen display which can display a touchscreen camera shutter button. In some cases, a user may opt to use the touchscreen camera shutter button rather than a mechanical camera shutter button. In cases where the input mechanism is provided via a touch screen display, additional options can also be used to control a subset of the image-capture functionality. In different implementations, such controls can include a still image capture mode button, a video capture mode button, an automatic image capture mode button, zoom-in and zoom-out controls, and an options or settings control.

It may be appreciated that the use of color is ubiquitous in modern interfaces and graphical displays. Colors are used to represent a wide variety of meanings including data categories, highlights, continuums, and specific values. Although color is a valuable tool in representation and visualization, many users in many different situations have difficulty differentiating the colors used on screen. Difficulty or inability to differentiate between two colors can have substantial consequences. The problems can range from annoyance and frustration (e.g., if the 'link visited' color in a web browser is indistinguishable from the normal link color), to severe issues of error or safety (e.g., matching colors between a bar chart and its legend, or recognizing an alert color against a background). The implementations described herein promotes social inclusion for colorblind users. For purposes of this application, the term social inclusion will refer to the process of improving the terms on which individuals and groups take part in society—improving the ability, opportunity, and dignity of those disadvantaged on the basis of their identity. One of the most influential internal barriers stem from the attitudes and motivations of people with a visual deficiency, particularly self-consciousness and low levels of confidence. Color vision deficiency is a condition with disadvantages that may not be readily apparent to others but has a significant impact on those it impacts. Colorblind accessibility of an image or real-world objects, for the purposes of the colorblind simulation and rendering techniques described herein, should be understood to refer to the degree to which an image can be perceived by a colorblind individual.

Thus, the colorblind accessibility of an image can be understood to depend generally on the degree to which significant information has been lost in colorblind perception. In general, even high-quality images can have low accessibility due to the color information loss perceived by a colorblind person, typically caused by an inability to discriminate between colors. Although most interface-design guidelines state that redundant encodings should be used in addition to color, there are many examples from information visualization and graphical interface design where this principle is not followed. Since up to ten percent of the world's population has CVD to some degree, addressing the problem of color differentiation could dramatically improve usability for a wide variety of users.

Aspects of the technical problems, technical solutions, and technical improvements can be described by way of examples illustrated in FIGS. 1A-9. As a general overview, FIGS. 1A and 1B present one implementation of a system and method for application of a virtual colorblindness corrective technique in a real-world setting. For purposes of illustration, colors in the drawings are represented by different styles or types of cross-hatching and stippling. In FIG. 1A, a visitor 110 to a museum 100 is shown as he looks toward a painting 120. The painting 120 includes several round objects that are colored in a specific pattern. However, the full or complete color pattern is not apparent to the visitor 110, who is red-green colorblind (see FIG. 2). FIG. 1A shows the painting 120 as perceived by the visitor 110, and accordingly including only two types of perceived colors, when in reality there are three colors. In FIG. 1A, a first perceived color 122 (shown with a first type of cross-hatching) is correctly perceived by the visitor 110 as blue. However, a second perceived color 124 (shown with a first type of stippling) is incorrectly perceived by the visitor 110 as a dull brown. However, in actuality, the portions of the painting 120 that are being perceived as being of the second perceived color 124 actually encompass two distinct colors, red and green, when viewed by a person with normal color vision. Thus, to the visitor 110, the true pattern of red, green, and blue cells of roughly equal shape and size within each circle is instead seen by the visitor 110 as smaller blue cells that are adjacent to a larger U-shaped segment of dull brown.

Figure 1B:
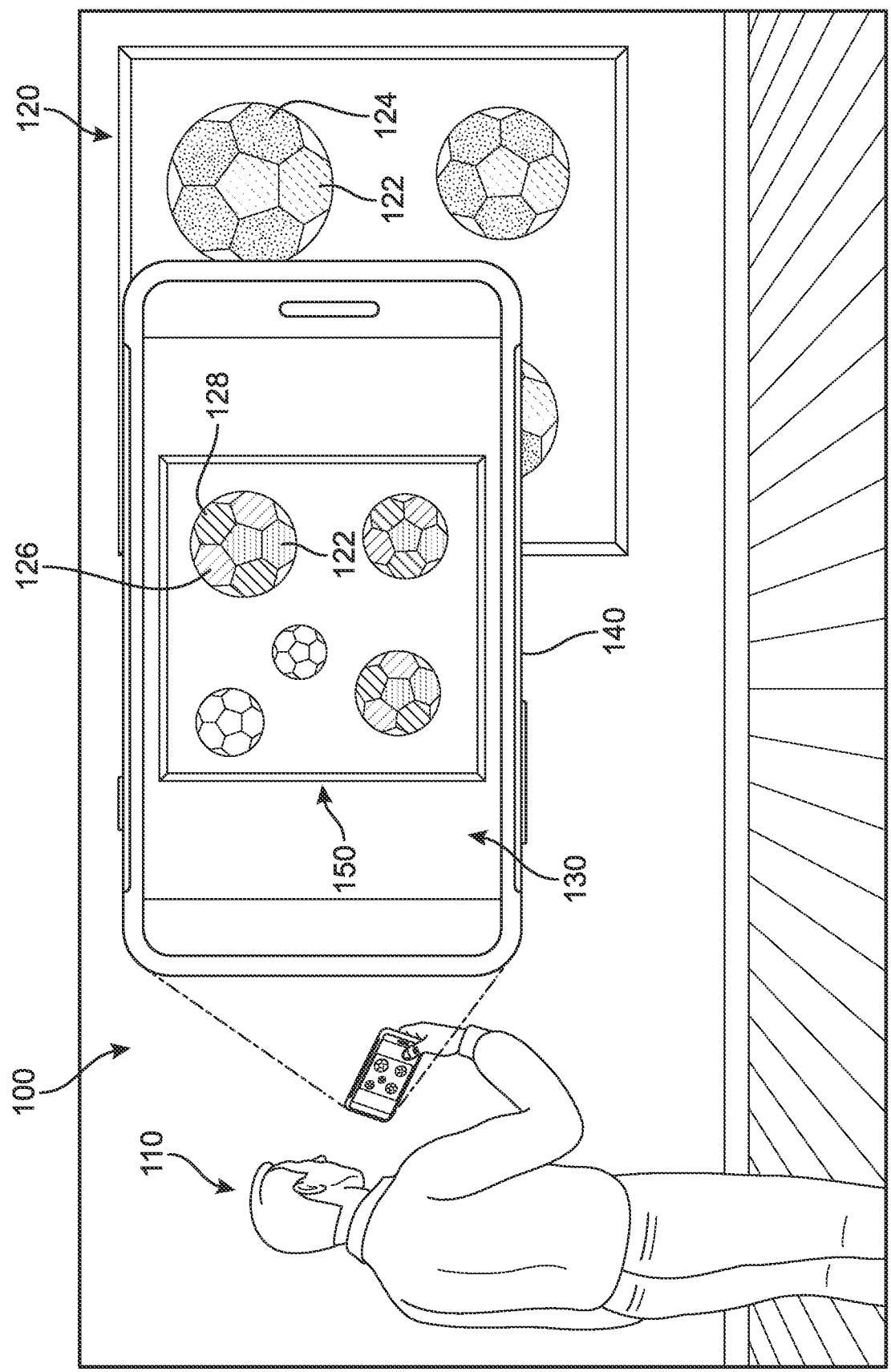

Referring now to FIG. 1B, the visitor 110 has accessed an implementation of a CVD assistive technology, here comprising a color-modifying application ("app") 130 for CVD users executing on a mobile device 140. The visitor 110 captures an image of the painting 120 using a camera included in the mobile device 140, which is received by the app 130 for processing. The app 130 then generates and displays a virtual view 150 including a color-modified version of the captured image which has been modified such that, as perceived by the visitor 110, the red and green colors are now distinguishable by the visitor 110 as a third perceived color 126 (shown with a second type of cross-hatching) and a fourth perceived color 128 (shown with a third type of cross-hatching), respectively. In some examples, the third perceived color 126 is perceived by the visitor 110 as a red color similar to the actual red color of the painting as would be seen by normal color vision, and the fourth perceived color 128 is perceived by the visitor 110 as a green color similar to the actual green color in the painting as would be seen by normal color vision. The brownish second perceived color 124 that had been previously perceived by the visitor 110 when directly gazing at the actual painting 120 is no longer perceived by the visitor 110 within the virtual view 150 (rendered image) of the same painting 120. Thus, the visitor 110 is now able to appreciate that there are three different colors in the painting 120, rather than the two perceived colors 122 and 124 when viewing the painting directly, the true nature of these colors (for example, the visitor 110 may be able to identify the third perceived color 126 as having a red hue and the fourth perceived color 128 as having a green hue), and enjoy the full pattern revealed by the arrangements of these three colors.

As noted above, although a significant portion of the general population has some form of CVD, color differentiation remains a common means of presenting information. Because normal visual processing in the human visual system typically allows for the rapid identification of colors, labeling objects with color—at least for those with normal color vision—can allow categorical information to be identified and distinguished quickly and efficiently. As one example, in categorical encoding, a unique color is assigned to each category of data, and all representations of this category in the visualization will then employ this color as an identifying characteristic. Color as a category is used in a number of information displays, including, for example, charts in spreadsheets, 'link taken' encodings in web browsers, syntax coloring in text editors, and tagged messages in email clients.

In order to more clearly underscore some of the effects of colorblindness for accessing and utilizing color encoded information, FIG. 2 illustrates a comparison between perceptions of the same image-based information by a user with normal color vision and a CVD user. A first image 210 depicts an original "real" image of a pie chart as perceived by the user with normal color vision, while a second image 220 depicts how the pie chart might appear to the CVD user (for example, with deuteranopia, or red-green color deficiency). In this example, the first image 210 includes four 'slices', wedges, or triangles in the larger circle that are identifiable because four distinct colors (represented in FIG. 2 with four different cross-hatching styles) have been used. Thus, the boundaries between a first segment 212 (having a red color), a second segment 214 (having a green color), a third segment 216 (having a light blue color), and a fourth segment 218 (having a dark blue color) may be readily discernable to those with normal color vision, as each segment is a different color. In other words, with no outlines around the segments, the only indication of boundaries between the segments is based on the use of different colors. In some cases, each segment can correspond to a respective hyperlink or other clickable command, where selection and/or actuation by a user of each colored segment is configured to trigger the presentation of information associated with that segment.

While this may serve as a simple and clear infographic tool to most normal vision persons, for those with CVD, important information and comprehension can be lost. The second image 220 in FIG. 2 is a simple demonstration of such a loss of information (represented by three different stippling patterns). Because the first image 210 included two adjacent segments 212 and 214 that were red and green, when instead viewed by a CVD user there is a clear loss of the division or boundary between the two segments, such that first segment 212 and second segment 214 appear to the CVD user as merged to form a single, fifth segment 222. The perceived coloring for a sixth segment 224 and a seventh segment 226 has also been affected, appearing differently than their counterparts in first image 210 (third segment 216 and fourth segment 218 respectively). The changes to the blue colors of sixth segment 224 and seventh segment 226 may have little effect on the information that is being communicated because both of these segments maintain a different appearance from one another; however, in other cases, CVD visual perception can cause essential information to not be correctly conveyed and understood.

More specifically, a red-green colorblind viewer would mistakenly believe that the pie chart is limited to only three segments (rather than four segments), and also that one of the segments has a much larger proportion of the pie chart than what was actually the case. In addition, the colorblind user would be unaware that there was an additional hyperlink available to them, and depending on the position of the mouse cursor may trigger information for either the first segment 212 or the second segment 214 when selecting the fifth segment 222, without realizing that the information is ambiguous. Furthermore, the difference in color intensity from the third segment 216 to the sixth segment 224 and also from the fourth segment 218 to the seventh segment 226 can cause a misinterpretation of information or otherwise hinder the ability of the viewer to comprehend the information.

In many cases, color may also be used to direct the attention of the user to a particular item or data point, rather than carry the data itself. In these cases, persons with CVD can also be at a disadvantage. For example, objects that are considered 'special' may be colored differently to distinguish them within a larger group (e.g., color pop-out). The pop-out color must be sufficiently different from other colors in the visualization for the effect to work. Generally, a saturated, bright, primary color will be used to replace the established element color. Pop-out allows for rapid identification and location of important items. Similarly, highlighting is the use of color to bring attention to an element or region of a visualization. Unlike pop-out, highlighting does not replace the element color in the visualization, but surrounds the element of interest. As a result, desaturated colors are often used to prevent the highlight from occluding the highlighted item. Color is also often used as a means to encode univariate or multivariate data. For example, the depth of a body of water can be encoded using shades of blue, where darker blues indicate deep water and lighter blues show shallow water. Another difficulty with these applications of hue scales is simultaneous contrast, which occurs when the perception of a color is influenced by surrounding colors. Poor awareness of CVD-related issues among creators of such interfaces with normal color vision can lead to failures in conveying the intended information content to CVD users.

Figure 3A:
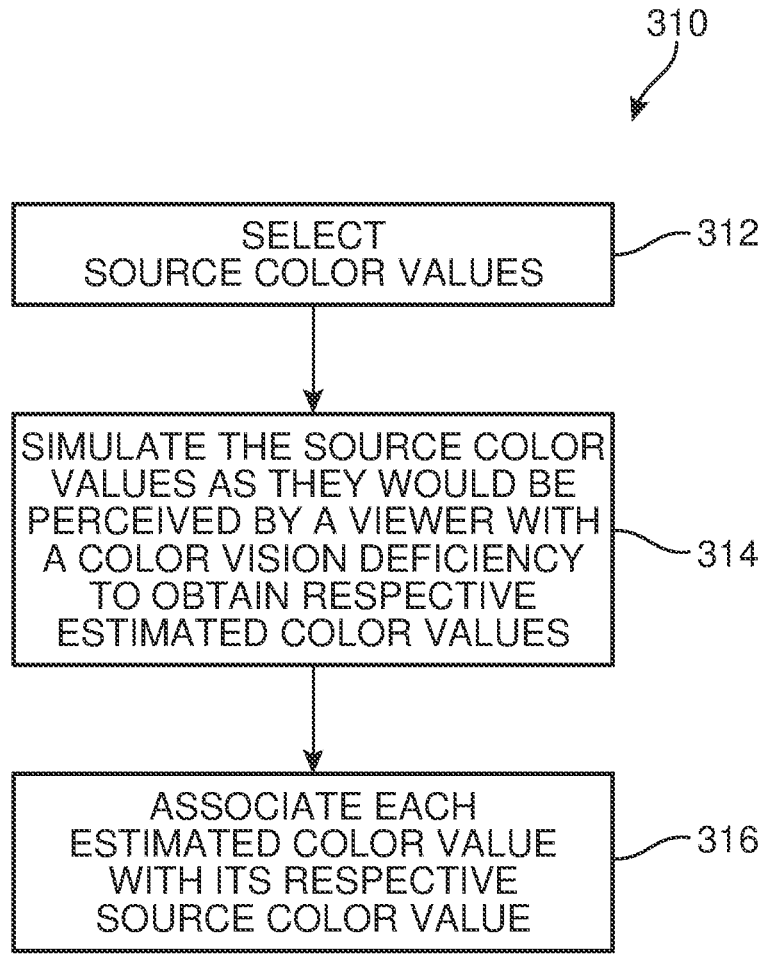
FIGS. 3A-3C are flow diagrams presenting a method for the rendering of a color-accessible image for viewing by a colorblind user.
Figure 3B:
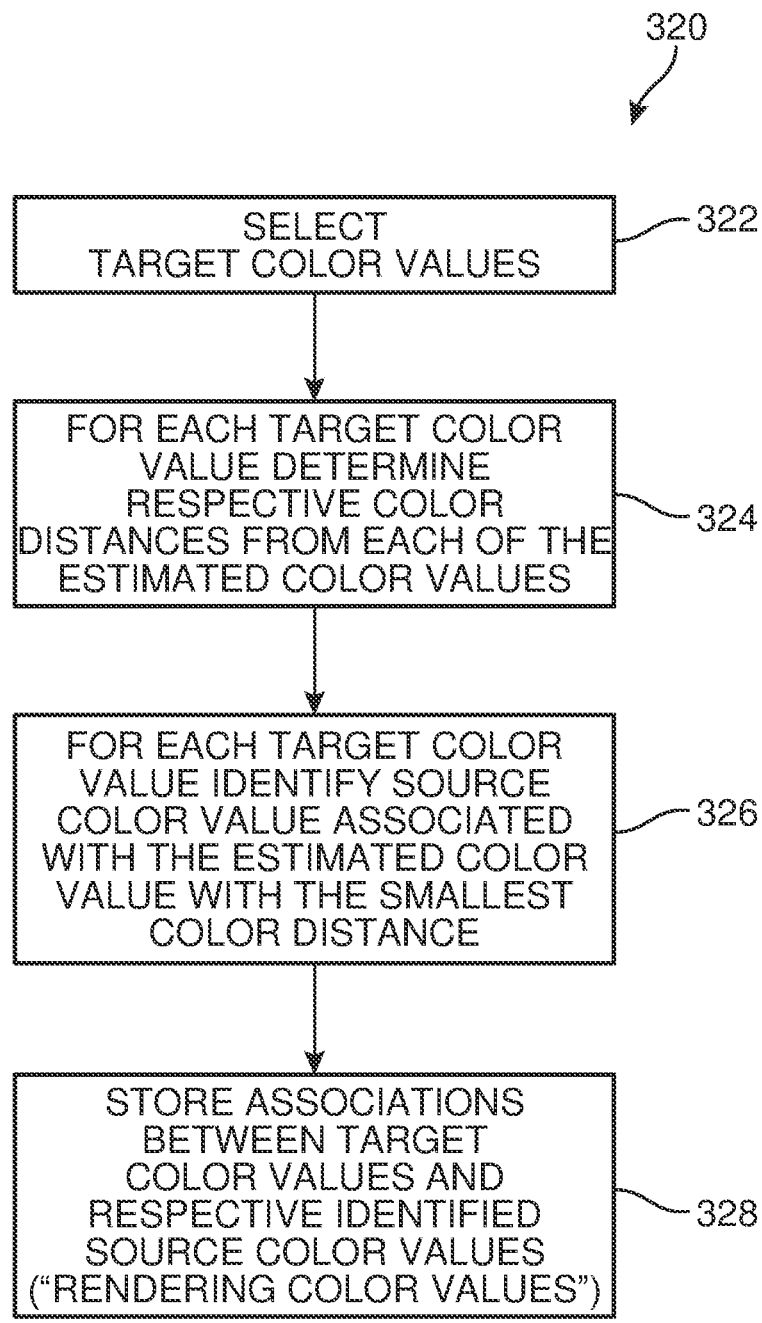
Figure 3C:
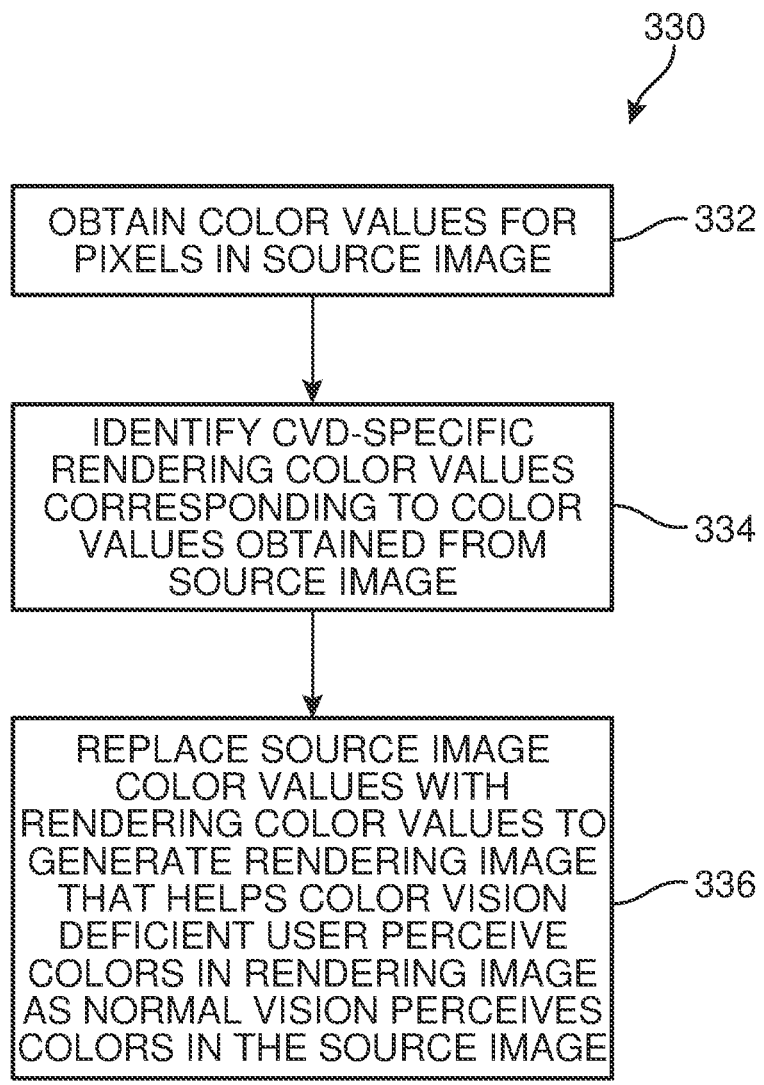

Thus, it may be appreciated that the ability to discriminate between and/or accurately identify colors can be of immense importance. As will be described in greater detail below, implementations of virtual color correction techniques described herein can provide for the accommodation of a CVD user's limitations in color perception. The techniques process an image or video input and modify the presentation of colors to facilitate color distinction and/or identification by individuals with CVD. FIGS. 3A-3C present three stages 310, 320, and 330 of an example method of generating a rendered image for a source image that improves color perception by a colorblind user. In a first stage 310, shown in FIG. 3A, perception of color values by a viewer with a color vision deficiency is simulated. This first stage 310 may include a first step 312 of selecting multiple source color values (which may be referred to as "source color values"). In some examples, color values are multicomponent color. Examples of multicomponent color values include, but are not limited to, three-component RGB color values (specifying values for a red color component, a green color component, and a blue color component), two-component RG color values (specifying values for a red color component and a green color component), and two-component BG color values (specifying values for a blue color component and a green color component). In some examples, a multicomponent color value may also be referred to as a multichannel color value. In some implementations, color values for the pixels of a source image may be used to identify the source color values. In some implementations, the source color values may be a generally applicable range of color values (for example, all possible combinations of color component values or sparse combinations of color component values).

The first stage 310 may include a second step 314 of simulating the source color values of the first step 312 as they would be perceived by a viewer with a color vision deficiency to obtain respective estimated color values (which may be referred to as "simulated color values"). There are various different color vision deficiencies that may be simulated. In some implementations, simulation of perception of source color values includes simulation of color rendering characteristics of a display device in rendering the source color values. For example, this may account for nonlinearities in color component intensities and/or spectral characteristics of the display device. Below are example pseudocode listings for several color vision deficiencies which generate simulated color component values "red sim," "green sim," and "blue sim" from source color component values "red," "green," and "blue."

Pseudocode Listing 1: Deuteranomaly Simulation

```
red_sim = red * (80 / 100) + green * (20 / 100)
green_sim = red * (25.833 / 100) + green * (74.167 / 100)
blue_sim = green * (14.167 / 100) + blue * (85.833 / 100)
```

Pseudocode Listing 2: Protanomaly Simulation

```
red_sim = red * (81.667 / 100) + green * (18.333 / 100)
green_sim = red * (33.333 / 100) + green * (66.667 / 100)
blue_sim = green * (12.5 / 100) + blue * (87.5 / 100)
```

Pseudocode Listing 3: Deuteranopia Simulation

```
red_sim = red * (62.5 / 100) + green * (37.5 / 100)
green_sim = red * (70 / 100) + green * (30 / 100)
blue_sim = green * (30 / 100) + blue * (70 / 100)
```

Pseudocode Listing 4: Protanopia Simulation

```
red_sim = red * (56.667 / 100) + green * (43.333 / 100)
green_sim = red * (55.833 / 100) + green * (44.167 / 100)
blue_sim = green * (24.167 / 100) + blue * (75.833 / 100)
```

The first stage 310 may include a third step 316 of associating each estimated color value with its respective source color value. For example, these associations may be stored in a memory as an array or listing of the estimated and/or source color values. Below, in Pseudocode Listing 5, an example implementation is shown for the first stage 310 for three-component RGB color values. Pseudocode Listing 6 shows another example implementation of the first stage 310 for two-component RG values and BG values, which requires substantially less memory than the example in Pseudocode Listing 5. In both Pseudocode Listings 5 and 6, 8-bit color component values ranging from 0-255 are used, and all possible combinations of color component values are simulated. It is understood that although the Pseudocode Listings 5 and 6 are shown for deuteranomaly simulation, as illustrated in Pseudocode Listing 1, the Pseudocode Listings 5 and 6 may be modified for other CVD simulations, such as those shown in Pseudocode Listings 2, 3, and 4.

Pseudocode Listing 5: Generation of Single RGB Simulation Table

```
RGBSimTable = byte [256 * 256 * 256 * 3]
void PopulateDeuteranomalyTable( )
{
  offset = 0
  for (red = 0; red < 256; red += 1) :
    for (green = 0; green < 256; green += 1) :
      for (blue = 0; blue < 256; blue += 1) :
        red_sim = red * (80 / 100) + green * (20 / 100)
        green_sim =
          red * (25.833 / 100) + green * (74.167 / 100)
        blue_sim =
          green * (14.167 / 100) + blue * (85.833 / 100)
```

-continued

```
        RGBSimTable [offset] = red_sim
        RGBSimTable [offset + 1] = green_sim
        RGBSimTable [offset + 2] = blue_sim
        offset += 3
}
```

Pseudocode Listing 6: Generation of RG and BG Color Translation Tables

```
RGSimTable = byte [256 * 256 * 2]
BGSimTable = byte [256 * 256 * 2]
void PopulateRGDeuteranomalySim ( )
{
  offset = 0
  for (red = 0; red < 256; red += 1) :
    for (green = 0; green < 256; green += 1) :
      red_sim = red * (80 / 100) + green * (20 / 100)
      green_sim = red * (25.833 / 100) + green *
        (74.167 / 100)
      RGSimTable [offset] = red_sim
      RGSimTable [offset + 1] = green_sim
      offset += 2
}
void PopulateBGDeuteranomalySim ( )
{
  offset = 0
  for (blue = 0; blue < 256; blue += 1) :
    for (green = 0; green < 256; green += 1) :
      blue_sim = green * (14.167 / 100.0) +
        blue * (85.833 / 100)
      BGSimTable [offset] = blue_sim
      BGSimTable [offset + 1] = green
      offset += 2
}
```

Referring next to FIG. 3B, an implementation of a second stage 320 of the method is presented, whereby simulated color values are used to generate a translation from target color values (which may be multicomponent color values) to respective rendering color values (which may be multicomponent color values) for a color vision deficiency. The second stage 320 may include a fourth step 322 of selecting multiple target multicomponent color values (which may be multicomponent color values), similar to the selection of the source color values in the first step 312. In some implementations, a sparse combination of target color values may be used in combination with interpolation for color values not included in the selected target color values. The second stage 320 may include a fifth step 324 of, for each target color value included in the target color values from the fourth step 322, determining respective color distances between the target color value and each of the estimated color values obtained in the second step 314. Various approaches may be used to calculate color distance, such as but not limited to a squared difference or sum of squared differences of some or all color component values, or an absolute difference or sum of absolute differences of some or all color component values. In the examples shown in Pseudocode Listings 7 and 8 below, color distance is calculated as a sum of squared differences of all color component values.

The second stage 320 may include a sixth step 326 of, for each target color value included in the target color values, identifying the source color value associated with the estimated color value with the smallest color distance determined in the fifth step 324. The second stage 320 may include a seventh step 328 of storing associations between each of the target color values and their respective source color values (which may be referred to a "rendering color values") identified in the sixth step 326. For example, these associations may be stored in a memory as an array or listing of the target and/or rendering color values. In some implementations, these associations may be stored in a texture for use by a fragment shader program executed by a GPU (graphics processor unit).

Below, in Pseudocode Listing 7 (which corresponds to the Pseudocode Listing 5 above), an example implementation is shown for the second stage 320 for three-component RGB color values. Pseudocode Listing 8 (which corresponds to the Pseudocode Listing 6 above) shows another example implementation of the second stage 320 for two-component RG values and BG values.

Pseudocode Listing 7: Generation of Single RGB Color Translation Table

```
RGBDeuteranomaly = byte [256 * 256 * 256 * 3]
void PopulateDeuteranomalyTable ( )
{
  offset = 0
  for (red = 0; red < 256; red += 1) :
    for (green = 0; green < 256; green += 1) :
      for (blue = 0; blue < 256; blue += 1) :
        min_pos = 0
        min_diff = ColorDistance (0, 255, 0, 255, 0, 255)
        for (pos = 0; pos < 256 * 256 * 256 * 3; pos += 3) :
          red_sim = RGBSimTable [pos]
          green_sim = RGBSimTable [pos + 1]
          blue_sim = RGBSimTable [pos + 2]
          cur_dist =
            ColorDistance (red, red_sim, green, green_sim,
              blue, blue_sim)
          if (cur_dist < min_diff) :
            min_diff = cur_dist
            min_pos = pos
        RGBDeuteranomaly[offset] = RGSimTable [min_pos]
        RGBDeuteranomaly[offset + 1] = RGSimTable [min_pos + 1]
        RGBDeuteranomaly[offset + 2] = RGSimTable [min_pos + 2]
        offset += 3
}
float ColorDistance (float comp1_a, float comp1_b,
        float comp2_a, float comp2_b,
        float comp3_a,float comp3_a)
{
  return (comp1_a - comp1_b) ^ 2 + (comp2_a - comp2_b) ^ 2 +
      (comp3_a - comp3_b) ^ 2
}
```

Pseudocode Listing 8: Generation of RG and BG Color Translation Tables

```
RGDeuteranomaly = byte [256 * 256 * 2]
BGDeuteranomaly = byte [256 * 256 * 2]
void PopulateRGDeuteranomalyTable ( )
{
  for (red = 0; red < 256; red += 1) :
    for (green = 0; green < 256; green += 1) :
      min_pos = 0
      min_diff = ColorDistance (0, 255, 0, 255)
      for (pos = 0; pos < 256 * 256 * 2; pos += 2) :
        red_sim = RGSimTable[pos]
        green_sim = RGSimTable[pos + 1]
        cur_dist = ColorDistance (red, red_sim, green,
            green_sim)
        if (cur_dist < min_diff) :
          min_diff = cur_dist
          min_pos = pos
      RGDeuteranomaly[offset] = RGSimTable[min_pos]
      RGDeuteranomaly[offset + 1] = RGSimTable[min_pos + 1]
      offset += 2
}
void PopulateBGDeuteranomalyTable ( )
{
  offset = 0
  for (blue = 0; blue < 256; blue += 1) :
```

```
    for (green = 0; green < 256; green += 1) :
      min_pos = 0
      min_diff = ColorDistance (0, 255, 0, 255)
      for (pos = 0; pos < 256 * 256 * 2; pos += 2) :
        blue_sim = BGSimTable[pos]
        green_sim = BGSimTable[pos + 1]
        cur_dist =
          ColorDistance (blue, blue_sim, green, green_sim)
        if (cur_dist < min_diff) :
          min_diff = cur_dist
          min_pos = pos
      BGDeuteranomaly[offset] = BGSimTable[min_pos]
      BGDeuteranomaly[offset + 1] = BGSimTable [min_pos + 1]
      offset += 2
}
float ColorDistance (float comp1_a, float comp1_b,
          float comp2_a, float comp2_b)
{
   return (comp1_a - comp1_b) ^ 2 + (comp2_a - comp2_b) ^ 2
}
```

Finally, in FIG. 3C, an implementation of a third stage 330 of the method is presented, where a rendered image improving color perception by a CVD user is generated for a source image. The third stage 330 includes an eighth step 332, in which a source image may be obtained and color values for the pixels of the source image are obtained. The third stage 330 includes a ninth step 334 of identifying CVD-specific rendering color values corresponding to the color values obtained from the source image in the eighth step 332. For example, the rendering color values may be determined from the target color value associations made in the seventh step 328. The third stage 330 includes a tenth step 336 of replacing the source image color values with their respective rendering color values (identified in the ninth step 334) to generate a rendering image that helps a CVD user perceive colors in the rendering image as a user with normal color vision receives colors in the original source image (to an extent permitted by the particular CVD involved). The rendered image assists CVD users in perceiving colors and/or distinctions between colors.

Below, in Pseudocode Listing 9 (which corresponds to the Pseudocode Listings 5 and 7 above), an example implementation is shown for the third stage 330 for three-component RGB color values. Pseudocode Listing 10 (which corresponds to the Pseudocode Listings 6 and 8 above) shows another example implementation of the third stage 330 for two-component RG values and BG values.

Pseudocode Listing 9: Transformation Using Single RGB Color Translation Table

```
// imagedata [ ] has pixels in BGRA byte-order with 8-bit color
// components
void TransformDeuteranomaly (byte [ ] imagedata)
{
  for (offset = 0; offset < imagedata. Length ( ) ; offset += 4) :
    blue_src = imagedata [offset]
    green_src = imagedata [offset + 1]
    red_src = imagedata [offset + 2]
    red_render =
      RGBDeuteranomaly [(red_src * 256 * 256 +
        green_src * 256 +
        blue_src) * 3]
    green_render =
      RGBDeuteranomaly [(red_src * 256 * 256 +
        green_src * 256 +
        blue_src) * 3 + 1]
    blue_render =
      RGBDeuteranomaly [(red_src * 256 * 256 +
        green_src * 256 +
        blue_src) * 3 + 2]
    imagedata[offset + 2] = red render
    imagedata[offset + 1] = green render
    imagedata[offset] = blue render
}
```

Pseudocode Listing 10: Transformation Using RG and BG Color Translation Tables

```
// imagedata [ ] has pixels in BGRA byte-order with 8-bit color
// components
void TransformDeuteranomaly(byte [ ] imagedata)
{
  for (offset = 0; offset < imagedata.Length ( ); offset += 4) :
    blue_src = imagedata[offset]
    green_src = imagedata[offset + 1]
    red_src = imagedata[offset + 2]
    red_render =
      RGDeuteranomaly[(red_src * 256 + green_src) * 2]
    green_render =
      RGDeuteranomaly[(red_src * 256 + green_src) * 2 + 1]
    blue_render =
      BGDeuteranomaly[(blue_src * 256 + green_src) * 2]
    imagedata[offset + 2] = red_render
    imagedata[offset + 1] = green_render
    imagedata[offset] = blue_render
}
```

In different implementations, the system may be configured to shift the color of the image to a color more distinguishable by the user. For instance, a green-colored object can be made to appear bluer, while a controllable dimming filter arranged in the device may be configured to controllably reduce the brightness of the real imagery in order to achieve the desired overall brightness level. In some implementations, the system may be configured to increase the brightness of the colors in the image without changing the hue. By increasing the brightness of these colors, the mildly impaired user may find the colors easier to distinguish.

Figure 4A:
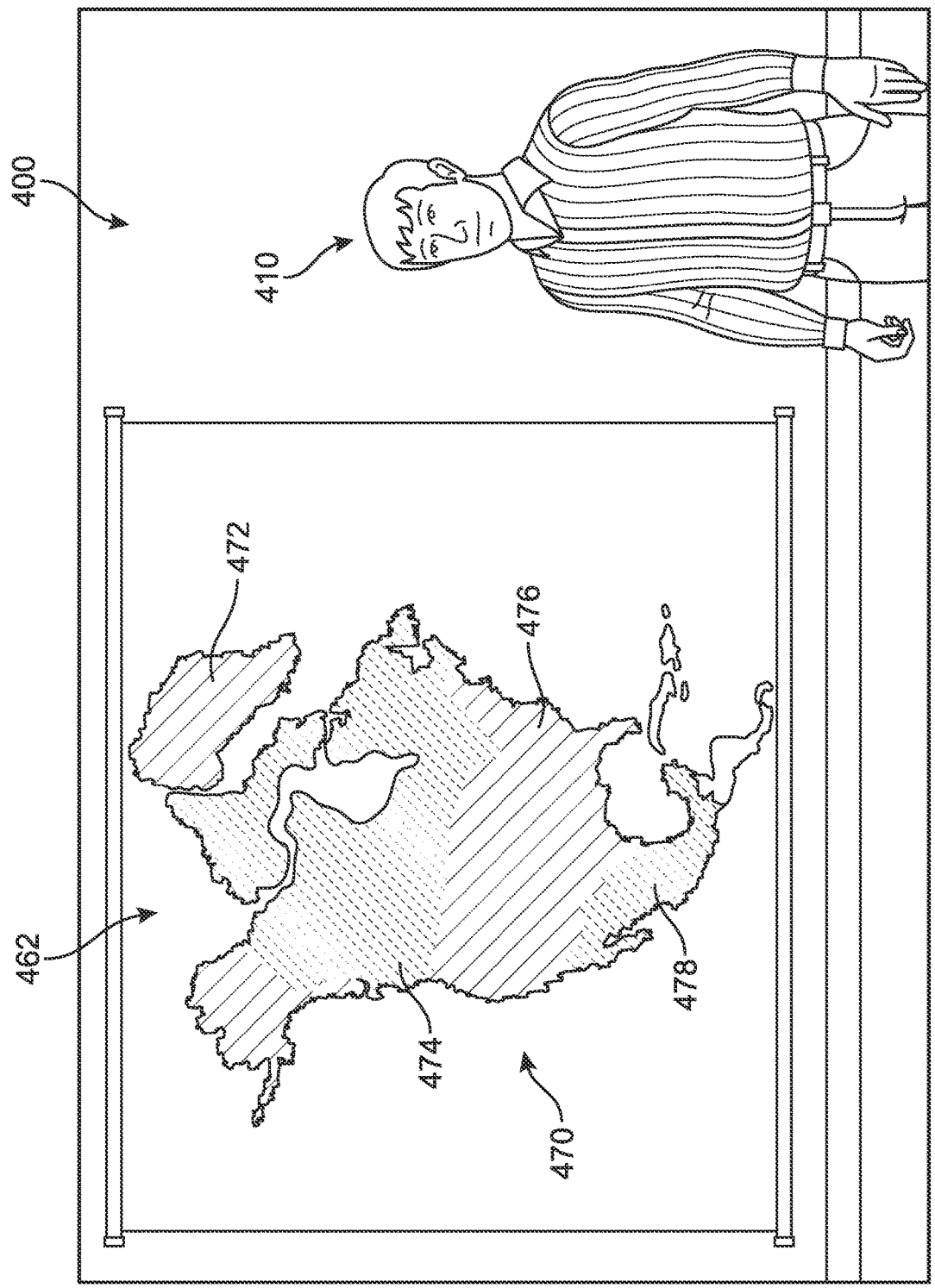
FIGS. 4A-4C illustrate an example of a color correction tool being implemented during a dynamic video capture session.
Figure 4B:
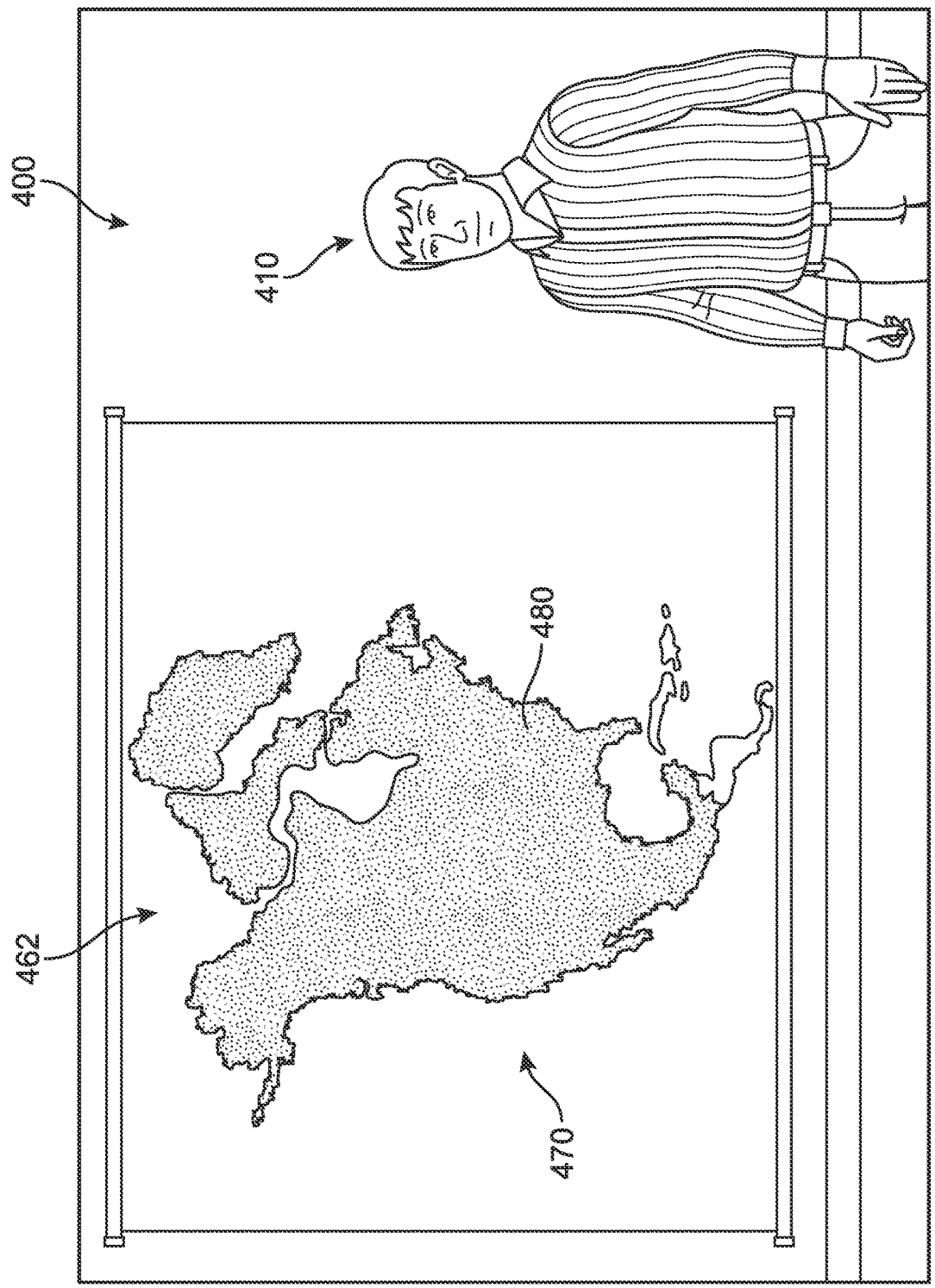
Figure 4C:
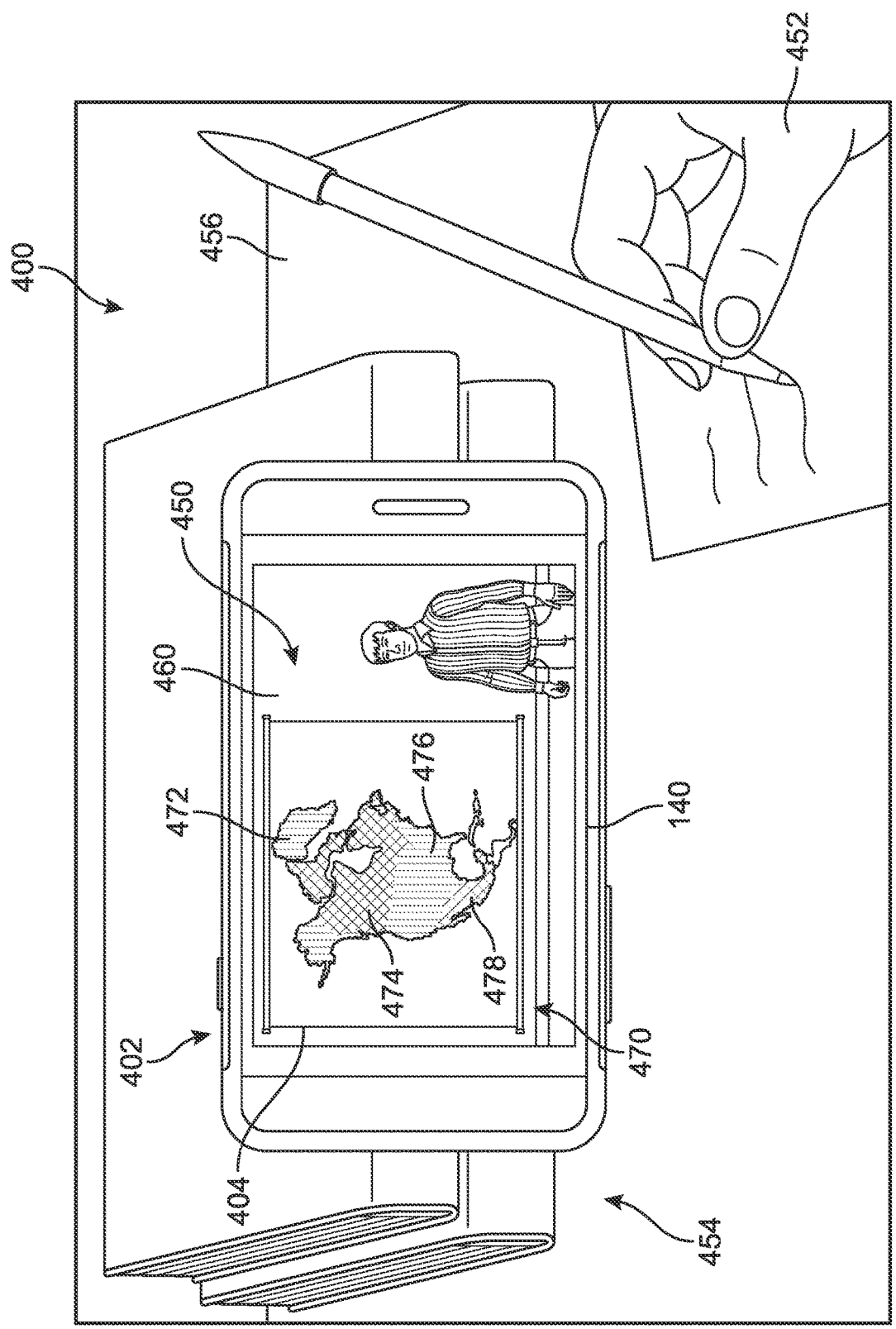

Referring now to FIGS. 4A-4C, for purposes of illustration, one example of an environment 400 is depicted in which a color correction process for CVD users is applied to a real-time or live video stream input. In different implementations, the environment can include one or more computing device end-users, or simply "users" who can capture or view an image or other electronic content. A user can interact with or manipulate the image presented via a user device. In many cases, users can be presented with a "live preview" of the real-world landscape as it is being viewed through the camera, though in other cases this preview can occur when a user opens or accesses a previously created image file or media. In different implementations, the color correction application can incorporate the functionality of a computing device to implement camera-based capture techniques that are described herein. The interfaces are typically presented in conjunction with a "viewfinder" that can present dynamic, current (real-time) images received by the camera optical lens and/or switch to present a captured image (i.e., a static photo or video saved in memory) when image have been taken or are being accessed from storage. Both dynamic and static image data can be the subject of the proposed color correction techniques, as well as saved image data or image data being received live (in real-time).

In FIG. 4A, a normal color view of environment 400 is shown which can be understood to serve as a classroom or a meeting room. A presenter 410 is standing adjacent to a projector screen 462 on which a map 470 is being displayed (in this particular example, a map of North America). The map 470 is segmented or partitioned by alternating colors (for example, red and green, or yellow and blue) to indicate the locations of a first country 472, a second country 474, a third country 476, and a fourth country 478. The colors for purposes of simplicity are represented by two types of cross-hatching, such that first country 472 and third country 476 are filled with a first (same) color, such as green, and second country 474 and fourth country 478 are filled with a second (same) color, such as red.

While some of the regions or objects in the image may correspond to non-critical information, such as purely aesthetic information, some of these regions or objects may contain highly-critical information. For example, the colored regions or objects in the image may contain information that is necessary for a viewer's understanding. As discussed above, for colorblind users, this type of scene can be fraught with information loss. FIG. 4B presents an example of how a colorblind user would perceive the same scene as shown in FIG. 4A. In FIG. 4B, the map 470 no longer offers any distinctions between the adjoining countries. Instead, the user (such as a student) can only see the continent as a whole (represented by a first type of stippling), with no sense of where borders might be. In addition, as presenter 410 speaks about the various regions on the map 470, the information remains without the graphical context that would otherwise be available to normal vision students.

An implementation of the benefits of the proposed system is then illustrated in FIG. 4C, where a first computing device ("first device") 402 is shown in the process of receiving a live first image 460 from the real-world scene that was shown in FIG. 4A. The image is shown via a device touch-screen display 450 that also functions as a user interface. A colorblind student 452 is seated at a desk 456 in the same classroom as the presenter of FIGS. 4A and 4B. The student 452 has propped up the first device 402 against books 454 and is viewing the lecture in real-time through the display 450 of first device 402. The first device 402 is running a color correction app ("app") 404 that converts the color palette shown in the first image 460 to a different color palette that is more fully perceptible to the student 452.

In some but not all implementations, the display 450 can be configured to present a live preview of the items or objects in the camera's field of view through the app 404. In one implementation, the app 404 can also offer a graphical user interface (not shown here), in conjunction with the image preview, referred to herein as an image content viewing interface ("interface"). In some implementations, the interface can be presented 'full-screen' on the display 450 or on only a portion of the display 450. In addition, in some implementations, portions of the interface may be substantially transparent or translucent, such that user interactions with the screen or image are received as inputs by the application while the image itself remains mostly visible without superimposition of additional interface graphics that would otherwise obstruct view of the image. However, in other implementations, the color correction application can present a variety of graphical elements in association with, overlaid on, or adjacent to the image, such as a menu, settings, or other options.

Generally, the term "interface" should be understood to refer to a mechanism for communicating content through a client application to an application user. For example, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. Furthermore, an "actuation" or "actuation event" refers to an event (or specific sequence of events) associated with a particular input or use of an application via an interface, such as a finger tap, keyboard command, voice command, or mouse-click, which can trigger a change in the display or functioning of the application or device.

Thus, as shown in FIG. 4C, the countries that were identifiable in the map 470 for normal color vision users (as shown in FIG. 4A) are now fully discernable by student 452 (represented by two different types of cross-hatching) in the first image 460. The colors that can be perceived by the student 452 can in some cases be substantially identical to the colors that are observed by a normal color vision viewer. In different implementations, the systems proposed herein can include provisions for detecting changes in a scene and triggering an automated update to the color palette for the changed scene during real-time or previously stored video. For example, as student 452 orients or positions the camera lens of the first device 402 in a direction that is generally towards or facing the projector screen, the system can continuously receive the image data for the real-world scene. As the presenter continues his discussion, he might advance through his slide deck to another slide. This change can be detected by the app 404 and trigger another color correction event to maintain a colorblind-accessible view of the scene. Thus, as the slides or other objects in the scene change, the student 452 can remain hands-free, secure in the knowledge that the app 404 will continue to receive image data from the camera and automatically re-process the incoming data if a change in the scene is detected. In other implementations, the reprocessing can occur as a result of a manual command inputted by the user, or can be configured to occur periodically following a preselected time interval. Such reprocessing is not necessary for static images such as photographs.

Figure 5A:
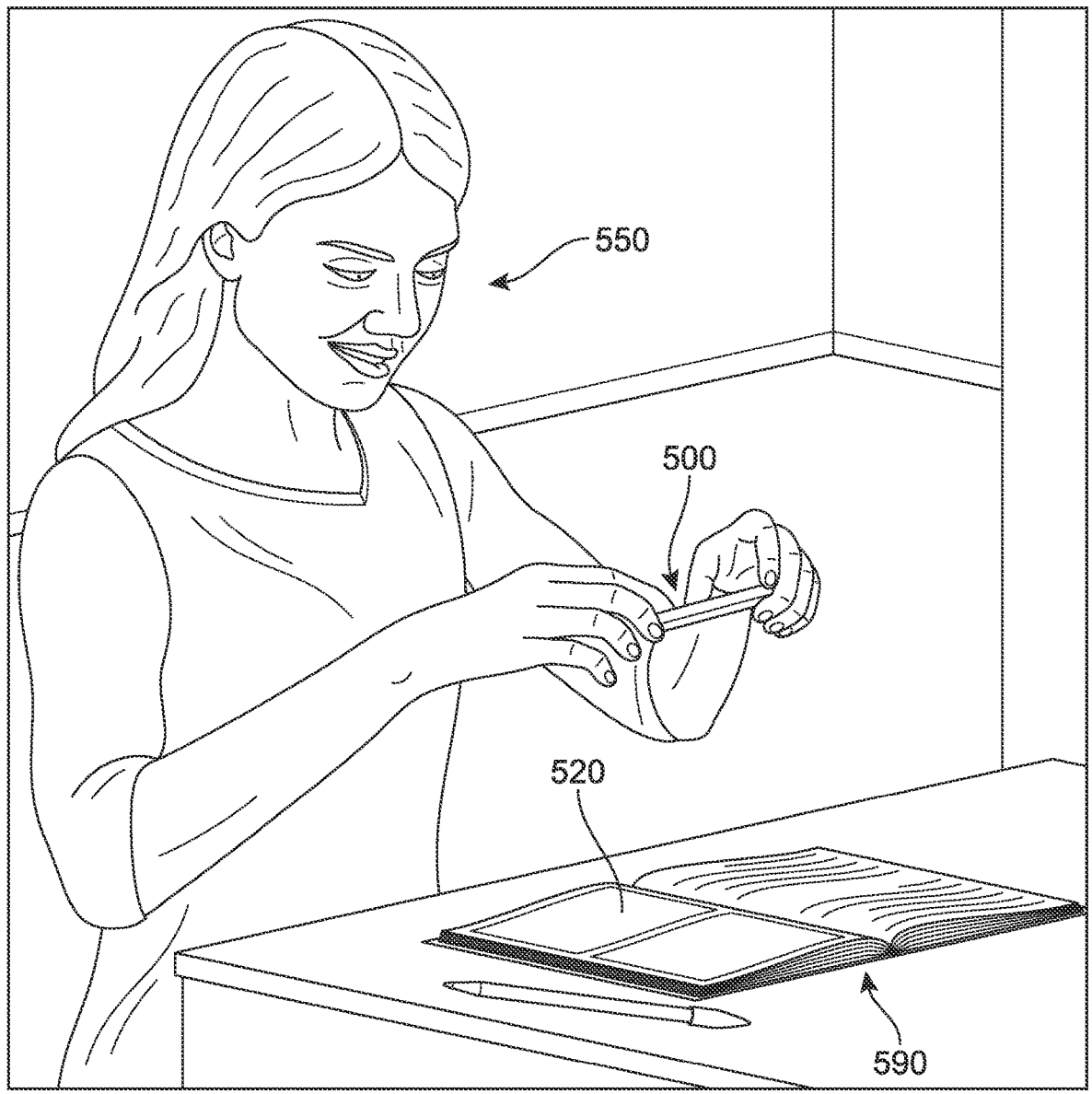
FIGS. 5A and 5B illustrate an example of a color correction tool being implemented with a static digital image.
Figure 5B:
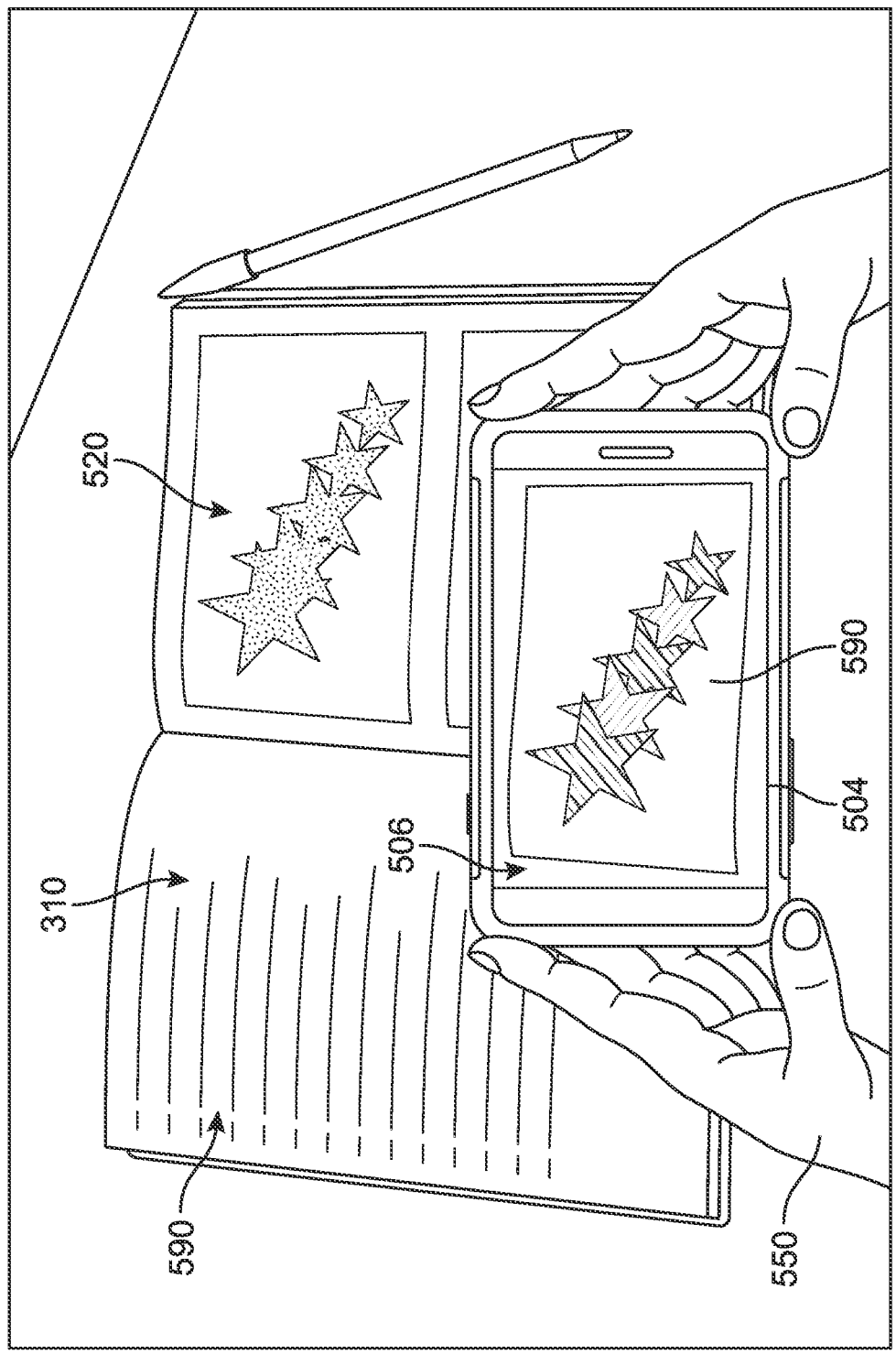

For purposes of clarity, a sequence providing another example of a color correction process in which an adjustment tool is provided is shown in FIGS. 5A-6C. Referring first to FIG. 5A, a user 550 holds a second computing device ("second device") 500 and is directing the device's camera lens toward an illustration 520 in a book 590. In FIG. 5B, the perspective of FIG. 5A has been changed to allow the reader to observe a display 506 of the second device 500 while the user 550 is engaging the color correction application. The display 506 presents an implementation of a color correction graphical user interface (GUI) for an image capture application ("application") 504. In different implementations, the application 504 can be configured to display the GUI and various user interface elements, features, and controls to facilitate capturing or loading image data, scanning, and/or processing of image data, and in some cases initiate a live preview of a scene or presentation of stored images. While the illustration 520 viewed with normal color vision includes a series of overlapping colors that distinguish each star shape from the adjacent star shape, this pattern is not apparent to user 550, who only sees a single color (represented by a first stippling type) within a larger multi-pronged shape when she is looking at the book 590. Once the illustration 520 has been obtained by the second device 500, it can be displayed as a static, rendered second image 590 via the application 504 on the display 506. As described above, through the application 504, the user 550 is then able to view the illustration with its correct color pattern.

Figure 6A:
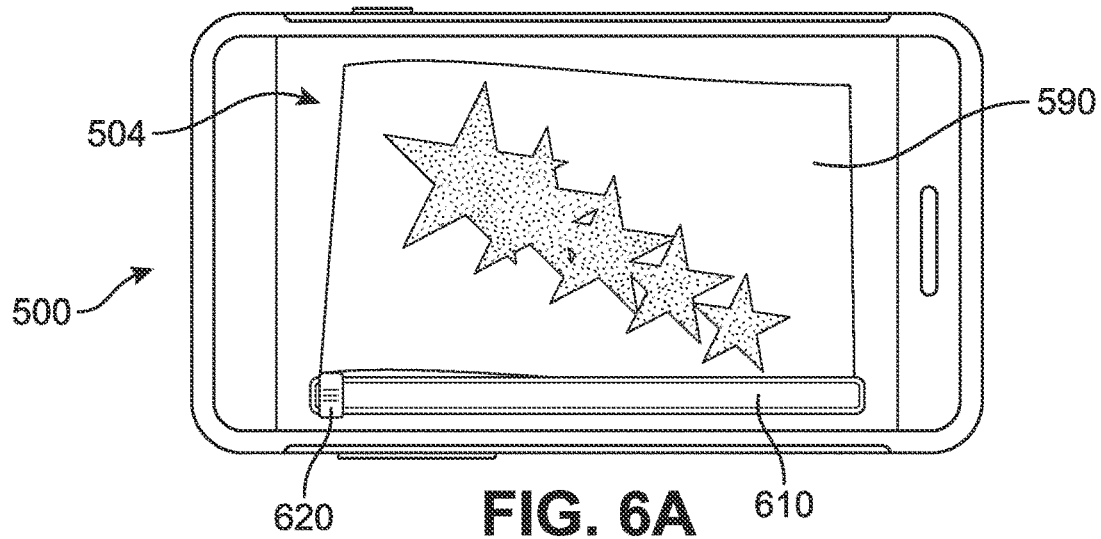
FIGS. 6A-6C are examples of a color adjustment tool for use with implementations of the color correction system.
Figure 6B:
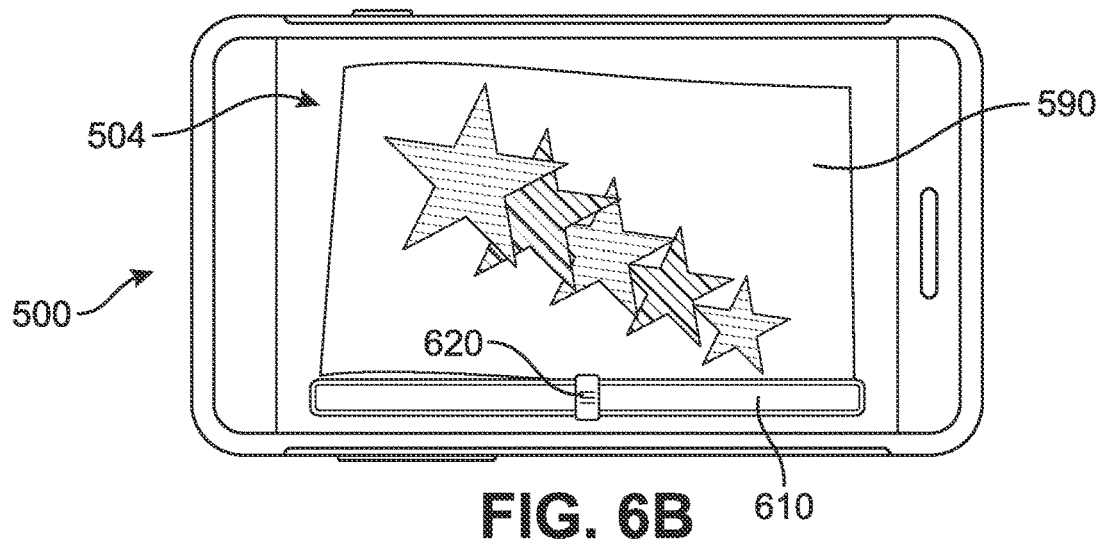
Figure 6C:
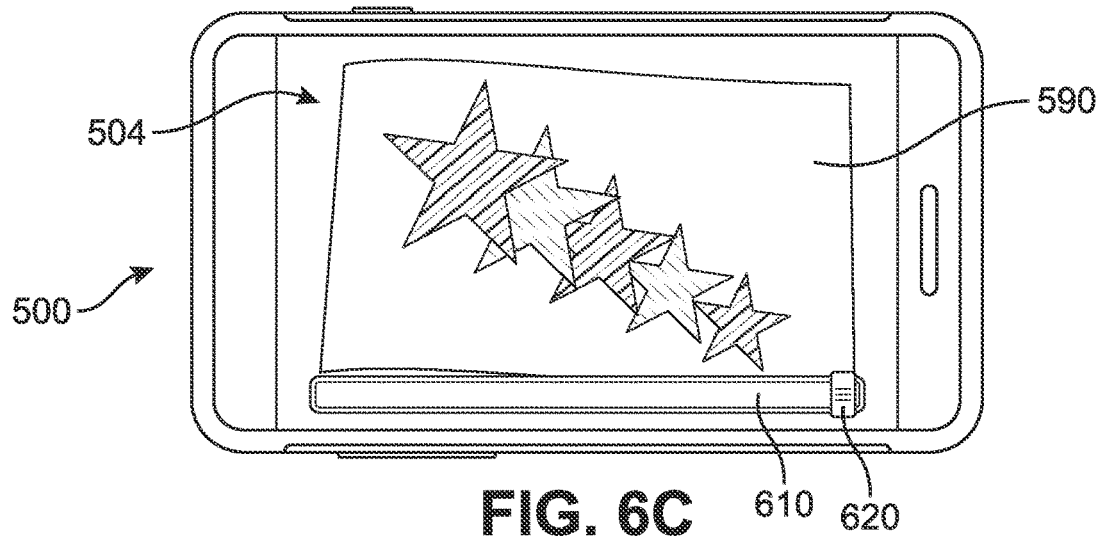

In some cases, a user may wish to adjust the color hues in order to better accommodate his or her own preference or color deficiency type. In different implementations, the system can include provisions for receiving user inputs and selections in order to establish appropriate viewing settings for the application 504. As shown in the example of FIGS. 6A-6C, the user has accessed an interactive tool 610, shown here as a sliding scale, of application 504. A user can slide or move a bar 620 across the tool 610 to adjust the degree or scale of color correction being rendered. In FIG. 6A, the bar 620 is at a first position closest to a lowermost (minimum) end of the available color spectrum, which has altered the appearance of the second image 590 such that only a single color is visible to the colorblind user (represented by a first type of stippling). In FIG. 6B, the bar 620 is at a second position toward a midpoint of the available colors, which alters the appearance of the second image 590 to now include a pair of colors (represented by a first and second type of cross-hatching) that are now visible to the colorblind user. Finally, in FIG. 6C, the bar 620 is at a third position closest to an uppermost (maximum) end of the available colors. There continues to appear to be two colors, but the color tones in second image 590 have been modified (represented by a third and fourth type of cross-hatching) to offer sharper or greater contrast. In different implementations, as the bar is moved up and down the scale between FIGS. 6B and 6C, the dominant hue (primary color) of each of the two colors may remain the same when perceived by the CVD viewer, while the properties of the hues may change in their eyes, including changes in color tint, tone, and/or shade. While a sliding scale is presented here for purposes of example, in other implementations, other selectable options may be used to perform such adjustments to the appearance of the images, such as a manual input of a number value representing the colors desired, a volume-type increase/decrease button, or other input types. For purposes of illustration, Pseudocode Listing 11 (corresponding to the examples shown in Pseudocode Listings 6, 8, and 10) below shows an example in which the above degree or scale (provided as the variable "percent") is used to provide a user-selectable of CVD color transformation.

Pseudocode Listing 11: Scalable Color Transformation

```
void PartialTransformDeuteranomaly(byte[ ] imagedata,
        int percent)
{
    for (offset = 0; offset < imagedata.Length ( ) ; offset += 4) :
        blue_src = imagedata [offset]
        green_src = imagedata [offset + 1]
        red_src = imagedata [offset + 2]
        red_render =
            RGDeuteranomaly[(red_src * 256 + green_src) * 2]
        red_render =
            red_src + (red_render - red_src)* (percent / 100)
        green_render =
            RGDeuteranomaly[(red_src * 256 + green_src) * 2 + 1]
        green_render =
            green_src + (green_render - green_src)*
                (percent / 100)
        blue_render =
            BGDeuteranomaly[(blue_src * 256 + green_src)* 2]
        blue_render =
            blue_src + (blue_render - blue_src) * (percent / 100)
        imagedata[offset + 2] = red_render
        imagedata[offset + 1] = green_render
        imagedata[offset] = blue_render
}
```

It should be understood that other customization options and settings may also be offered via application 504, including several capture or operating modes, such as a live capture mode (see FIGS. 4A-4C), a static image mode as shown in FIGS. 5A-6C, and a saved video or image mode. These modes can be offered to the user upon start-up of application 504, and/or be set as a default mode. In different implementations, a user can initiate the color correction process by viewing or capturing a real-world scene (e.g., taking a picture or photograph), by capturing or viewing an image that can include virtually-generated objects (e.g., digital media, screenshots, snipping tool), and/or by loading any previously captured or saved images or media files for viewing through the application. In addition, as noted earlier, in some implementations, the application can be configured to operate in conjunction with other software instances, for example by accessing the color correction app as an add-on tool while using another software application, such as a web browser, productivity applications, or other applications, in particular those applications that depend on color to convey information. In one implementation, the proposed systems may be used to render color accessible content some portions or the entirety of a displayed 'page' such as a document or website by conversion of the problematic pixels with reference to the base table.

In different implementations, the app 504 may be configured to receive input(s) from the user to help determine how to adapt or adjust the appearance of colors for the user. The input may control or affect, directly or indirectly, which color or colors are to be selected by the system. For example, in one implementation, the user may specify the particular type of color vision deficit that he or she experiences. Optionally, the input may also specify a degree or severity of the color vision deficit. In another implementation, the user may specify one or more colors in the real imagery that should be corrected, for example, the specified color could be a color poorly distinguishable by the user's unaided eye. In some other implementations, user input(s) may be received by the system in response to visual tests initially presented to the user to allow the system to determine the type of color correction that should be applied. Based upon the results of such color tests, the system may be calibrated to adapt to the color vision deficiency or deficiencies of the particular user.

Figure 7:
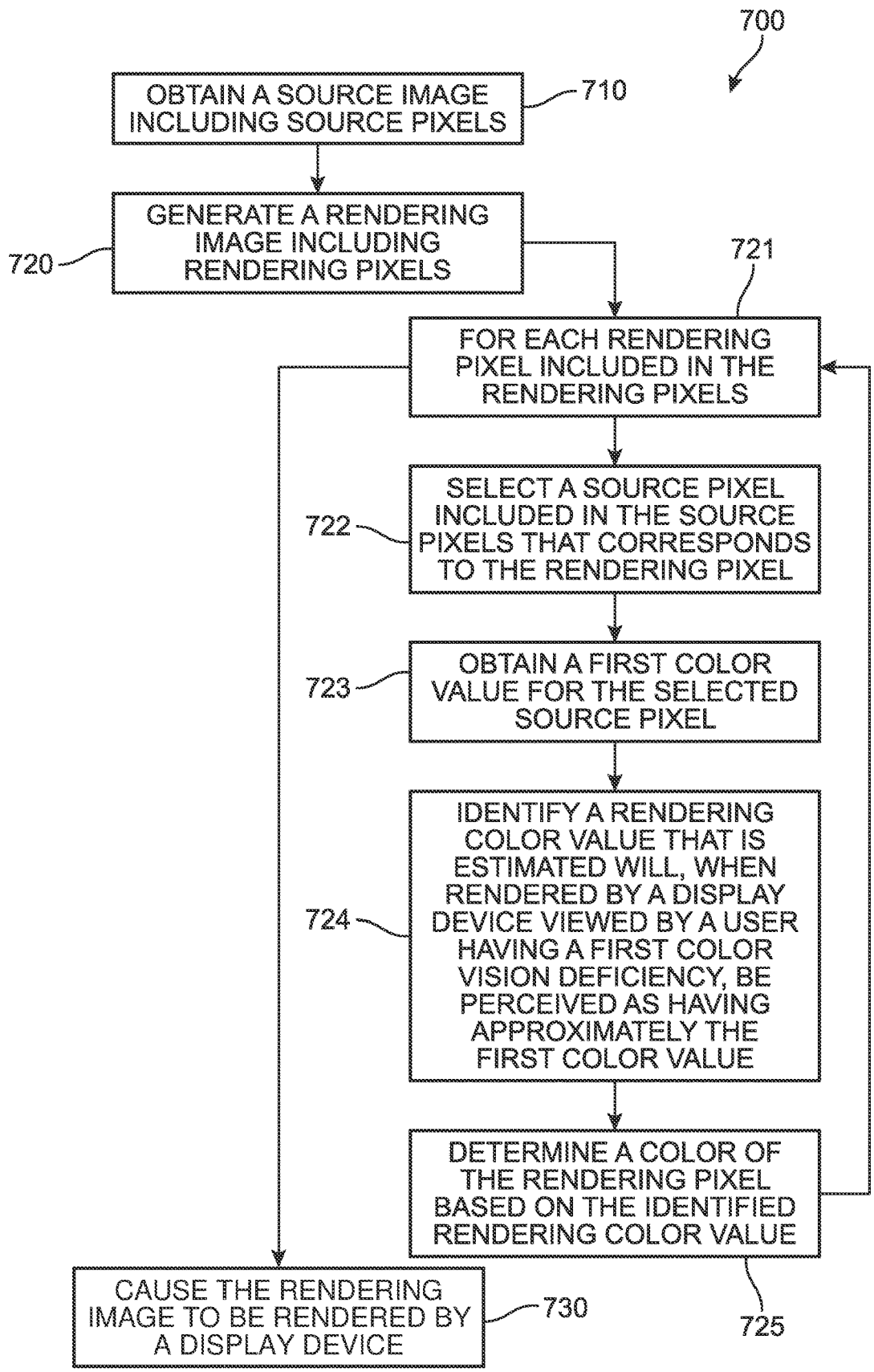
FIG. 7 is a flow chart presenting one implementation of a method of operation of a color correction tool.

FIG. 7 is a flow chart illustrating an implementation of a method 700 of improving image rendering for color vision deficient users. As shown the example of FIG. 7, a first step 710 includes obtaining a source image that includes a plurality of source pixels. A second step 720 includes generating a rendering image that includes a plurality of rendering pixels. The second step 720 occurs by a process, repeated for each rendering pixel 721 included in the plurality of rendering pixels, that comprises a first sub-step 722, second sub-step 723, third sub-step 724, and fourth sub-step 725. The first sub-step 722 includes selecting a source pixel included in the plurality of source pixels that corresponds to the rendering pixel, and the second sub-step 723 includes obtaining a first color value (which may be a multicomponent color value) for the selected source pixel. The third sub-step 724 includes identifying a first rendering color value (which may be a multicomponent color value) that is estimated will, when rendered by a display device viewed by a user having a first color vision deficiency, be perceived by the user as having the first color value. The fourth sub-step 725 includes determining a color of the rendering pixel based on the identified first rendering color value. Finally, the method 700 includes a third step 730 of causing the generated rendering image to be rendered by a first display device.

In other implementations, additional steps may be included. For example, in some implementations, the step of identifying the first rendering color value comprises obtaining a second rendering color value stored at a memory location determined based on the first color value, and identifying the first rendering color value based on the obtained second rendering color value.

In another example, the first color value can be a two-component color value consisting of a red component and a first green component. In such cases, the generating the rendering image further includes, for each rendering pixel included in the plurality of rendering pixels, obtaining a second color value for the selected source pixel, wherein the second color value is a two-component color value consisting of a blue component and a second green component, and identifying a second rendering color value that is estimated will, when rendered by a display device viewed by the user having the first color vision deficiency, be perceived by the user as having the second color value. In addition, determining the color of the rendering pixel can be based on the identified first rendering color value and the identified second rendering color value.

In some implementations, the step of identifying the first rendering color value comprises obtaining a third rendering color value stored at a memory location determined based on the first color value, and identifying the first rendering color value based on the obtained third rendering color value. Furthermore, in such cases, the identifying the second rendering color value comprises obtaining a fourth rendering color value stored at a memory location determined based on the second value, and identifying the second rendering color value based on the obtained fourth rendering color value.

In some implementations, the first color vision deficiency is deuteranomaly or protanomaly, while in other implementations, the first color vision deficiency is deuteranopia or protanopia. In one implementation, the source image is obtained based on an image frame included in a series of image frames captured by a camera, and the rendering image is rendered by the display device in real time with respect to a capture of the image frame by the camera.

In another example, the method further includes steps of presenting, via the first display device, a user interface allowing a user to select a degree of color adjustment, and storing the degree of color adjustment. In such cases, the determining the color of the rendering pixel includes identifying a color value between the first color value and the first rendering color value according to the stored degree of color adjustment.

Other methods may be contemplated within the scope of the present disclosure. For example, in some embodiments, a method of generating a model for color vision deficiency image transformation model includes a first step of selecting a plurality of source color values (which may be multicomponent color values). The method further includes a second step of generating a plurality of estimated color values (which may be multicomponent color values) associated with the source color values. The second step is performed by a process repeated for each source color value included in the plurality of source color values. The process includes simulating that the source color value, as rendered by a display device, will be perceived by a user having a first color vision deficiency as having a first estimated color value included in the plurality of estimated values, and associating the source color value with the estimated color value. The method also includes a third step of selecting a plurality of target color values (which may be multicomponent color values). In addition, the method includes a fourth step comprising a process performed for each target color value included in the plurality of target color values. This process includes selecting, from the plurality of estimated values, a second estimated color value as the target color value, selecting, from the plurality of source color values, a rendering color value (which may be a multicomponent color value) as being associated with the second estimated color value, and storing an association between the target color value and the rendering color value.

In other implementations, additional steps may be included. For example, in some implementations, selecting the second estimated color value includes identifying a minimum color distance between the target color value and each of the plurality of estimated values. In another example, simulation of perception of the source color value by the user includes simulation of color rendering characteristics of the display device.

The detailed examples of systems, devices, and techniques described in connection with FIGS. 1-7 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 8:
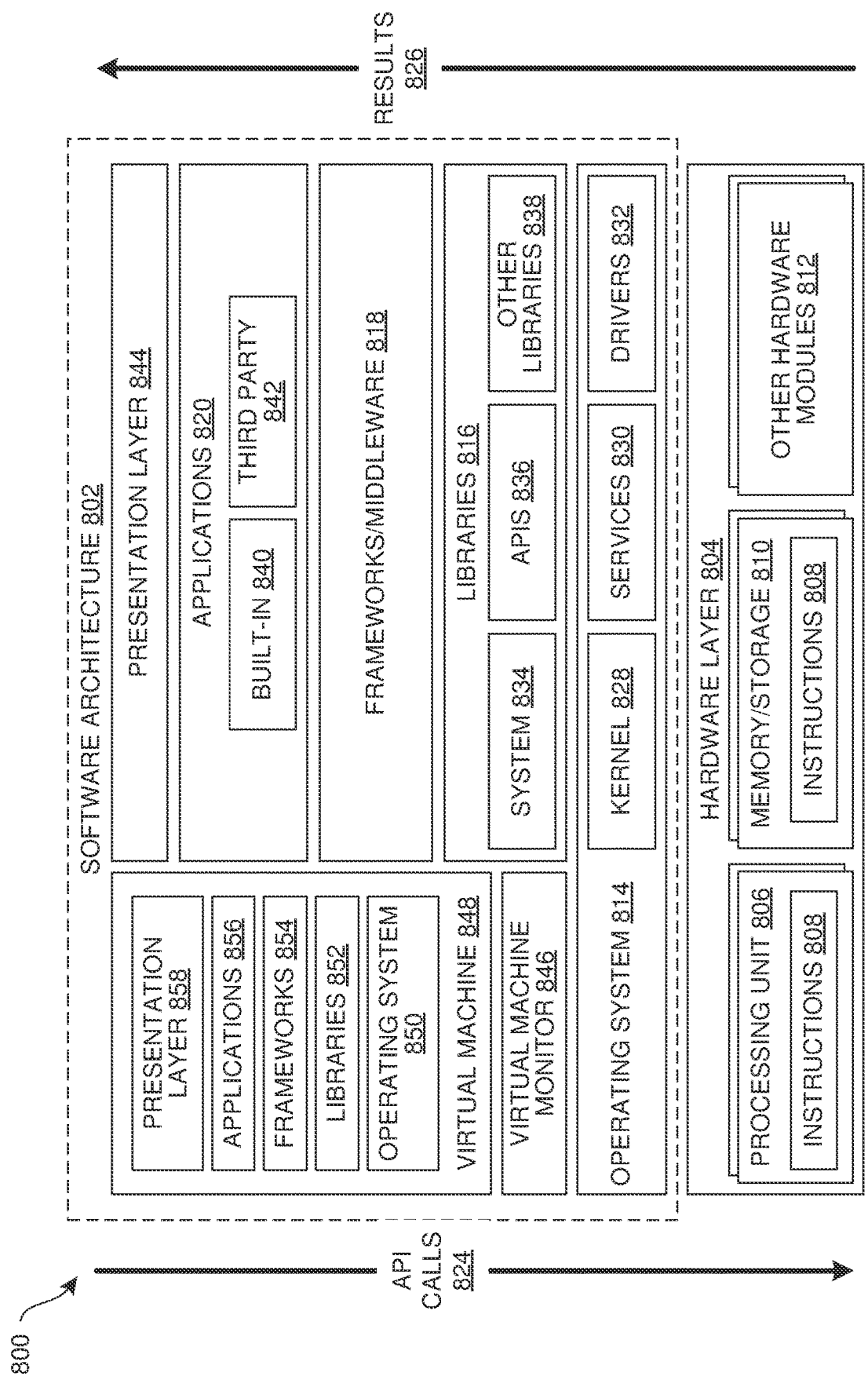
FIG. 8 is a block diagram illustrating an example software architecture, various portions of which may be used in conjunction with various hardware architectures herein described, which may implement any of the features herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture and it will be appreciated that many other architectures may be implemented to facilitate the functionality described herein. The software architecture 802 may execute on hardware that includes, among other things, document storage 870, processors, memory, and input/output (I/O) components. A representative hardware layer 804 is illustrated. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 808 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 800 of FIG. 8, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
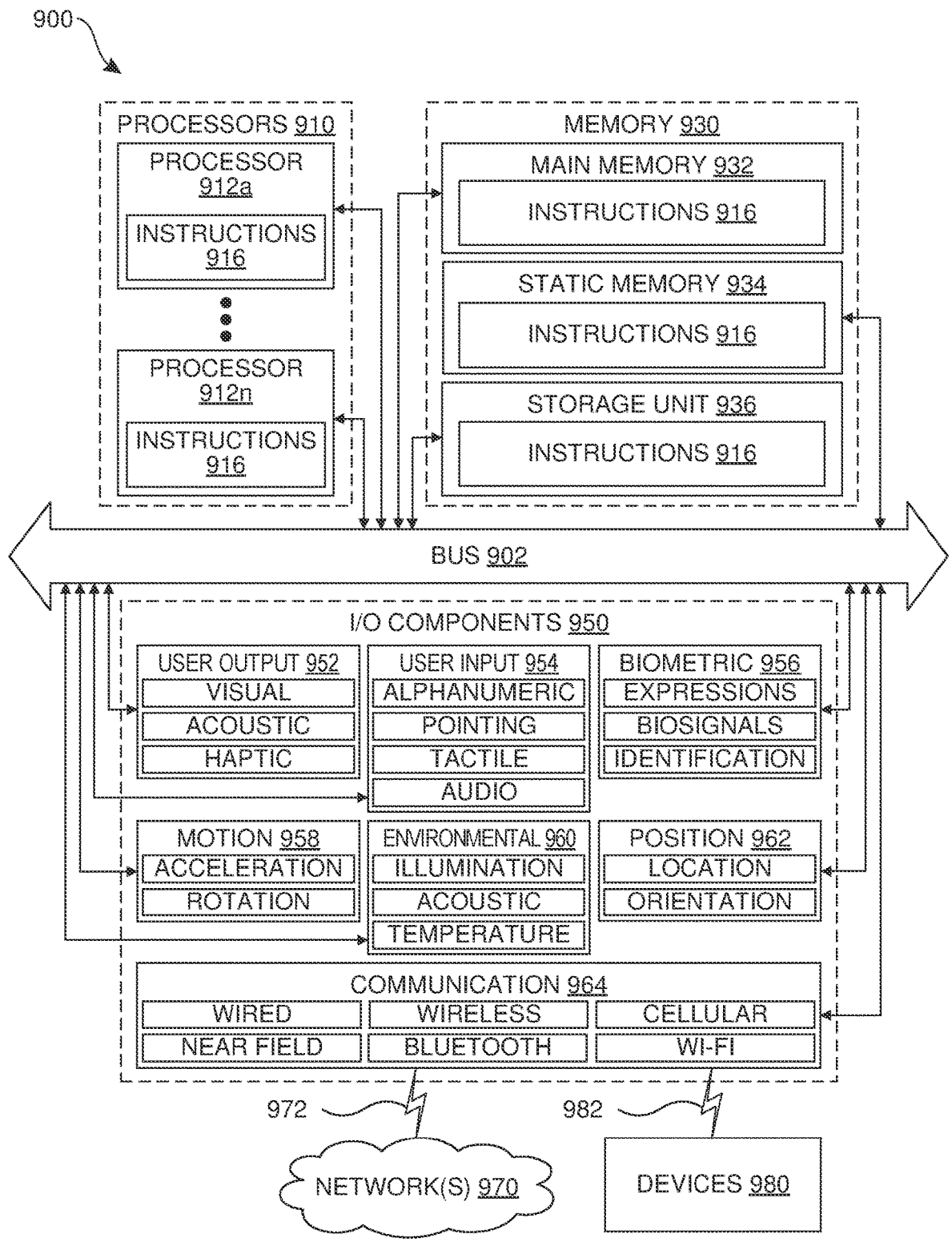
FIG. 9 is a block diagram illustrating components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" include a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956 and/or position components 962, among a wide array of other environmental sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method of generating a color translation table for color vision deficiency (CVD) correction comprising:
   selecting a plurality of source color values;

for each of the source color values, identifying a respective estimated color value associated with the source color value, the estimated color value being a simulation of the source color value as it would be perceived by a user with CVD;
associating each estimated color value with its respective source color value;
generating the color translation table by:
  selecting a plurality of target color values;
  for each target color value included in the plurality of target color values, determining respective color distances from each of the estimated color values;
  for each target color value in the plurality of target color values, identifying one of the source color values associated with one of the estimated color values having a smallest color distance from the target color value; and
  storing associations between each of the target color values and respective identified source color values to provide the color translation table between the source color values and the target color values to be substituted for the source color values in a display on a display device corrected for the user with CVD; and
utilizing the color translation table to convert colors in a source image to corrected colors for display for the user with CVD on the display device.

2. The method of claim 1, wherein the source color values are identified from color values for pixels of a source image.

3. The method of claim 1, wherein the source color values are identified from a combination of color component values.

4. The method of claim 1, wherein the target color values are multicomponent color values.

5. The method of claim 1, wherein the simulation of perception of the source color value by the user includes simulation of color rendering characteristics of the display device.

6. The method of claim 1, further comprising identifying a minimum color distance by using a squared difference or a sum of squared differences of at least a portion of the estimated color values.

7. The method of claim 3, wherein the minimum color distance is determined by using a squared difference or a sum of squared differences of all of the estimated color values.

8. The method of claim 1, wherein:
the source image from which the plurality of source color values is obtained is based on an image frame included in a series of image frames captured by a camera.

9. The method of claim 8, wherein:
a rendering image with a rendering color value is rendered as rendering pixels by the display device in real time with respect to a capture of the image frame by the camera.

10. The method of claim 1, further comprising:
presenting, via the display device, a user interface allowing a user to select a degree of color adjustment; and
storing the degree of color adjustment.

11. The method of claim 1, further comprising:
obtaining the source image including a plurality of source pixels with the plurality of source color values;
generating a rendering image including a plurality of rendering pixels to be displayed on a display device by, for each rendering pixel included in the plurality of rendering pixels:
  selecting a source pixel included in the plurality of source pixels that corresponds to the rendering pixel,
  obtaining a first color value for the selected source pixel,
  identifying a first rendering color value estimated, when rendered by the display device viewed by a user having a first color vision deficiency, to be perceived by the user as having the first color value, and
  determining a color of the rendering pixel based on the identified first rendering color value; and
causing the generated rendering image to be rendered by the display device.

12. A machine-readable medium including instructions therein which, when executed by a processor, causes the processor, alone or in combination with other processors, to perform functions as follows for generating a color translation table for color vision deficiency (CVD) correction:
selecting a plurality of source color values;
for each of the source color values, identifying a respective estimated color value associated with the source color value, the estimated color value being a simulation of the source color value as it would be perceived by a user with CVD;
associating each estimated color value with its respective source color value;
generating the color translation table by:
  selecting a plurality of target color values;
  for each target color value included in the plurality of target color values, determining respective color distances from each of the estimated color values;
  for each target color value in the plurality of target color values, identifying one of the source color values associated with one of the estimated color values having a smallest color distance from the target color value; and
  storing associations between each of the target color values and respective identified source color values to provide the color translation table between the source color values and the target color values to be substituted for the source color values in a display on a display device corrected for the user with CVD; and
utilizing the color translation table to convert colors in a source image to corrected colors for display for the user with CVD on the display device.

13. The machine-readable medium of claim 12, wherein the source color values are identified from color values for pixels of a source image.

14. The machine-readable medium of claim 12, wherein the source color values are identified from a combination of color component values.

15. The machine-readable medium of claim 12, wherein a minimum color distance is determined by using a squared difference or a sum of squared differences of all of the estimated color values.

16. The machine-readable medium of claim 12, wherein:
the source image from which the plurality of source color values is obtained is based on an image frame included in a series of image frames captured by a camera.

17. The machine-readable medium of claim 16, wherein:
a rendering image with a rendering color value is rendered as rendering pixels by the display device in real time with respect to a capture of the image frame by the camera.

18. The machine-readable medium of claim 17, further comprising:

presenting, via the display device, a user interface allowing a user to select a degree of color adjustment; and
storing the degree of color adjustment.

19. The machine-readable medium of claim 12, further comprising:
obtaining a source image including a plurality of source pixels with the plurality of source color values;
generating a rendering image including a plurality of rendering pixels to be displayed on the display device by, for each rendering pixel included in the plurality of rendering pixels:
selecting a source pixel included in the plurality of source pixels that corresponds to the rendering pixel,
obtaining a first color value for the selected source pixel,
identifying a first rendering color value estimated, when rendered by the display device viewed by a user having a first color vision deficiency, to be perceived by the user as having the first color value, and
determining a color of the rendering pixel based on the identified first rendering color value; and
causing the generated rendering image to be rendered by the display device.

20. A system for generating a color translation table for color vision deficiency (CVD) correction comprising:
a processor; and
a memory, coupled to the processor, configured to store executable instructions that, when executed by the processor, alone or in combination with other processors, cause the processor to:
select a plurality of source color values;
for each of the source color values, identify a respective estimated color value associated with the source color value, the estimated color value being a simulation of the source color value as it would be perceived by a user with CVD;
associate each estimated color value with its respective source color value;
generate the color translation table by:
selecting a plurality of target color values;
for each target color value included in the plurality of target color values, determining respective color distances from each of the estimated color values;
for each target color value in the plurality of target color values, identifying one of the source color values associated with one of the estimated color values having a smallest color distance from the target color value; and
storing associations between each of the target color values and respective identified source color values to provide the color translation table between the source color values and the target color values to be substituted for the source color values in a display on a display device corrected for the user with CVD; and
utilize the color translation table to convert colors in a source image to corrected colors for display for the user with CVD on the display device.

* * * * *